US010534343B2

(12) United States Patent
Hamaguchi

(10) Patent No.: US 10,534,343 B2
(45) Date of Patent: Jan. 14, 2020

(54) UNIT AND CONTROL SYSTEM

(71) Applicant: Mitsubishi Electric Corporation, Chiyoda-ku (JP)

(72) Inventor: Akihiro Hamaguchi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/084,463

(22) PCT Filed: Mar. 31, 2016

(86) PCT No.: PCT/JP2016/060778
§ 371 (c)(1),
(2) Date: Sep. 12, 2018

(87) PCT Pub. No.: WO2017/168706
PCT Pub. Date: Oct. 5, 2017

(65) Prior Publication Data
US 2019/0079485 A1 Mar. 14, 2019

(51) Int. Cl.
*G06F 15/16* (2006.01)
*G05B 19/05* (2006.01)
*G05B 9/03* (2006.01)

(52) U.S. Cl.
CPC ............ *G05B 19/054* (2013.01); *G05B 9/03* (2013.01); *G05B 19/056* (2013.01); *G06F 15/16* (2013.01); *G05B 2219/15118* (2013.01)

(58) Field of Classification Search
None
See application file for complete search history.

(56) References Cited

U.S. PATENT DOCUMENTS

| 5,136,582 A * | 8/1992 | Firoozmand | H04L 47/521 370/400 |
| 5,548,768 A * | 8/1996 | Gallup | G06N 3/063 712/200 |
| 8,233,303 B2 * | 7/2012 | Best | G11C 5/02 365/51 |
| 8,284,845 B1 * | 10/2012 | Kovacevic | H04N 21/4305 370/389 |

(Continued)

FOREIGN PATENT DOCUMENTS

JP 2002-323909 A 11/2002
JP 2005-56051 A 3/2005

(Continued)

OTHER PUBLICATIONS

International Search Report dated Jun. 28, 2016, in PCT/JP2016/060778, filed Mar. 31, 2016.

(Continued)

*Primary Examiner* — Michael Sun
(74) *Attorney, Agent, or Firm* — Oblon, McClelland, Maier & Neustadt, L.L.P.

(57) ABSTRACT

A unit is connected to both devices to be controlled and the other unit. The unit includes a control unit connected to the devices to be controlled, and a shared memory to be capable of storing therein information. The control unit allocates control data related to the devices to be controlled to the shared memory of its own unit and the shared memory of the other unit so as to be stored respectively in the shared memories.

16 Claims, 17 Drawing Sheets

(56) References Cited

U.S. PATENT DOCUMENTS

| | | | |
|---|---|---|---|
| 8,738,860 B1* | 5/2014 | Griffin | G06F 12/0897 |
| | | | 711/122 |
| 9,432,298 B1* | 8/2016 | Smith | H04L 49/9057 |
| 2003/0046380 A1* | 3/2003 | Steger | H04L 43/14 |
| | | | 709/223 |
| 2003/0093503 A1* | 5/2003 | Yamaki | G06F 19/00 |
| | | | 709/220 |
| 2013/0304402 A1 | 11/2013 | Ukena et al. | |
| 2016/0065448 A1* | 3/2016 | Loveless | G09C 1/00 |
| | | | 370/218 |
| 2017/0052521 A1 | 2/2017 | Fukal et al. | |
| 2017/0090498 A1* | 3/2017 | Jetcheva | G05B 15/02 |

FOREIGN PATENT DOCUMENTS

| | | |
|---|---|---|
| JP | 2009-289167 A | 12/2009 |
| JP | 2015-215803 A | 12/2015 |
| WO | WO 2012/098676 A1 | 7/2012 |

OTHER PUBLICATIONS

Japanese Office Action, Notification of Reason for Refusal dated Apr. 26, 2017, in Japanese Patent Application No. 2017-506810, 5 pages.

Japanese Office Action, Notification of Reason for Refusal dated Sep. 13, 2017, in Japanese Patent Application No. 2017-506810, citing document AR therein, 7 pages.

Japanese Office Action, Decision of Refusal dated Feb. 2, 2018, in Japanese Patent Application No. 2017-506810, 5 pages.

* cited by examiner

FIG.2

| UNIT NAME | UNIT NUMBER |
|---|---|
| UNIT 3-1 | 1 |
| UNIT 3-2 | 2 |
| ⋮ | ⋮ |

FIG.3

| NAME OF DEVICE TO BE CONTROLLED | NUMBER OF DEVICE TO BE CONTROLLED |
|---|---|
| DEVICE 2-1 TO BE CONTROLLED | 1 |
| DEVICE 2-2 TO BE CONTROLLED | 2 |
| DEVICE 2-3 TO BE CONTROLLED | 3 |
| ⋮ | ⋮ |
| DEVICE 2-N TO BE CONTROLLED | N |

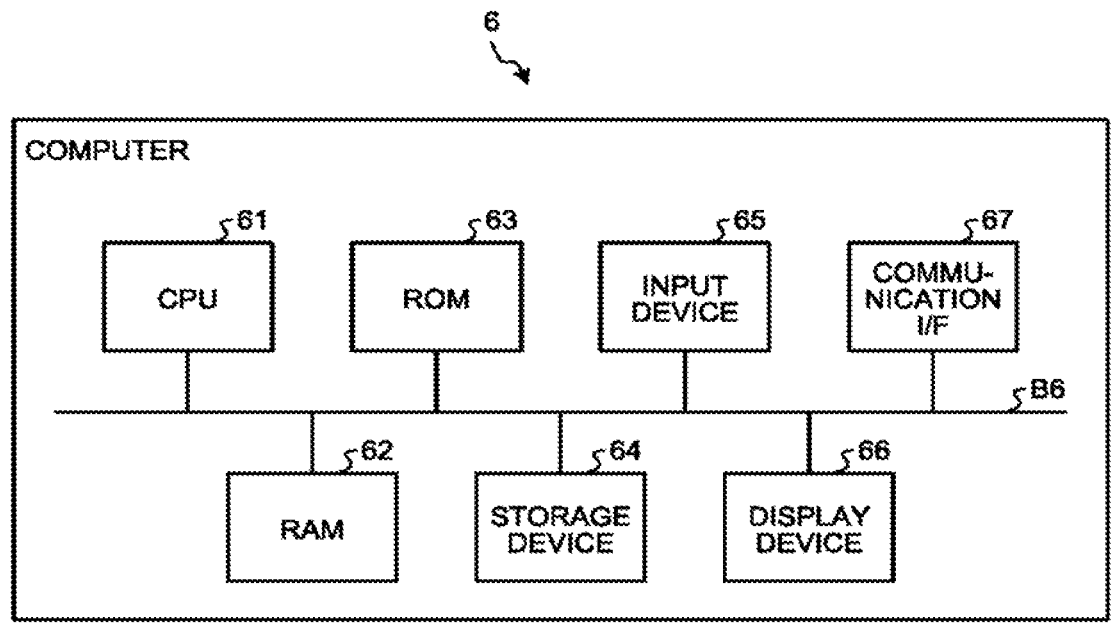

| | PRIORITY | UNIT AND DEVICE TO BE CONTROLLED |
|---|---|---|
| HIGH | 1 | DEVICE 1 TO BE CONTROLLED OF UNIT 1 |
| ↕ | 2 | DEVICE 2 TO BE CONTROLLED OF UNIT 2 |
| LOW | 3 | DEVICE 3 TO BE CONTROLLED OF UNIT 1 |

| NUMBER OF DEVICE TO BE CONTROLLED | PRIORITY |
|---|---|
| 1 | 1 |
| 2 | - |
| 3 | 2 |
| ⋮ | ⋮ |
| N | - |

| NUMBER OF DEVICE TO BE CONTROLLED | PRIORITY |
|---|---|
| 1 | - |
| 2 | 1 |
| 3 | - |
| ⋮ | ⋮ |
| N | - |

UNIT AND CONTROL SYSTEM

FIELD

The present invention relates to a unit and a control system that control-target devices in the field of Factory Automation (FA).

BACKGROUND

In the facilities in the FA field, devices to be controlled that are control-target devices are controlled by a distributed control system. The distributed control system includes a controller unit, typically, a Programmable Logic Controller (PDC), and a remote unit connected to the controller unit via a network and located in a distributed manner (see Patent Literature 1). Generally, a plurality of remote units are installed for a single controller unit, each of which is connected to one or more devices to be controlled.

As a remote unit, a unit having one of input and output functions for a digital-signal, or a unit having one of input and output functions for an analog signal has been commonly known. Due to the characteristics that the remote units are located in a distributed manner, these remote units need to be sized smaller than the controller unit that constitutes the distributed control system, and need to operate with a minimum hardware configuration in order to reduce the overall cost of the distributed control system.

Particularly, a remote unit including an analog-signal input interface (hereinafter, "remote analog unit") can change the type of input signal in accordance with the specifications of an analog device that is a device to be controlled, the device being supposed to be connected to the remote analog unit. Simultaneously, the remote analog unit can also change the input range. The remote analog unit has a voltage value and a current value as the type of input signal. The remote analog unit can change the type of input signal between the voltage value and the current value. The remote analog unit can change the input range to at least any of the range from −10 V to 10 V, the range from 0 V to 10 V, the range from 0 mA to 20 mA, and the range from 4 mA to 20 mA. The remote analog unit can continuously monitor a change in the input signal. Thus, increased attention has been focused on the remote analog unit as means of state monitoring or abnormality diagnosis. The remote analog unit sometimes obtains and stores therein an input signal (hereinafter, "logging"). Patent Literature 1 proposes a technique to transmit an input signal logged by a remote unit to an external computer via a PLC system.

CITATION LIST

Patent Literature

Patent Literature 1: Japanese Patent Application Laid-open No. 2002-323009

SUMMARY

Technical Problem

The remote unit described above has the following problem in logging an input signal, which is unique to the distributed control system. The remote units are supposed to be located in a distributed manner and thus have a problem with shortage of data storage area because each remote unit cannot be mounted with an internal memory or an external storage medium with a sufficient storage area for the purpose of minimizing individual product costs.

Taking into account operational stability and accuracy of timing, a distributed control system used in the facilities in the FA field is required to complete the control within the PLC system. Thus, there still remain some problems in applying the technique disclosed in Patent Literature 1. The remote unit is required to effectively use a storage area of a memory.

The present invention has been achieved to solve the above problems, and an object of the present invention is to provide a unit that can effectively use a storage area of a memory in the unit.

Solution to Problem

In order to solve the above problems and achieve the object, the present, invention is a unit, connected to both another unit and one or more control-target devices. The unit includes a control unit connected to the control-target devices and a first storage unit to be capable of storing therein information. The control unit allocates control data related to the control-target devices to the first storage unit and a second storage unit of the another unit so as to be stored respectively in the first storage unit and the second storage unit.

Advantageous Effects of Invention

The unit according to the present invention has an effect where it is possible to effectively use the storage area of a memory in the unit.

BRIEF DESCRIPTION OF DRAWINGS

FIG. 2 is a diagram illustrating an example in which each unit is assigned with a number in the control system according to the first embodiment.

FIG. 3 is a diagram illustrating an example in which devices to be controlled in each individual unit are individually assigned with a number in the control system according to the first embodiment.

FIG. 4 is a diagram illustrating a hardware configuration of a computer in the control system according to the first embodiment.

FIG. 5 is a diagram illustrating an example of logging setting information that is set in a logging setting unit within the unit in the control system according to the first embodiment.

FIG. 6 is a diagram illustrating an example of logging priority information that is set in a priority setting unit within the unit in the control system according to the first embodiment.

FIG. 11 is a diagram illustrating logging priority information of devices to be controlled connected to one of the units in the control system according to the first embodiment.

FIG. 12 is a diagram illustrating logging priority information of devices to be controlled connected to the other unit in the control system according to the first embodiment.

DESCRIPTION OF EMBODIMENTS

A unit and a control system according to embodiments of the present invention will be described in detail below with reference to the accompanying drawings. The present invention is not limited to the embodiments.

First Embodiment

Figure 1:
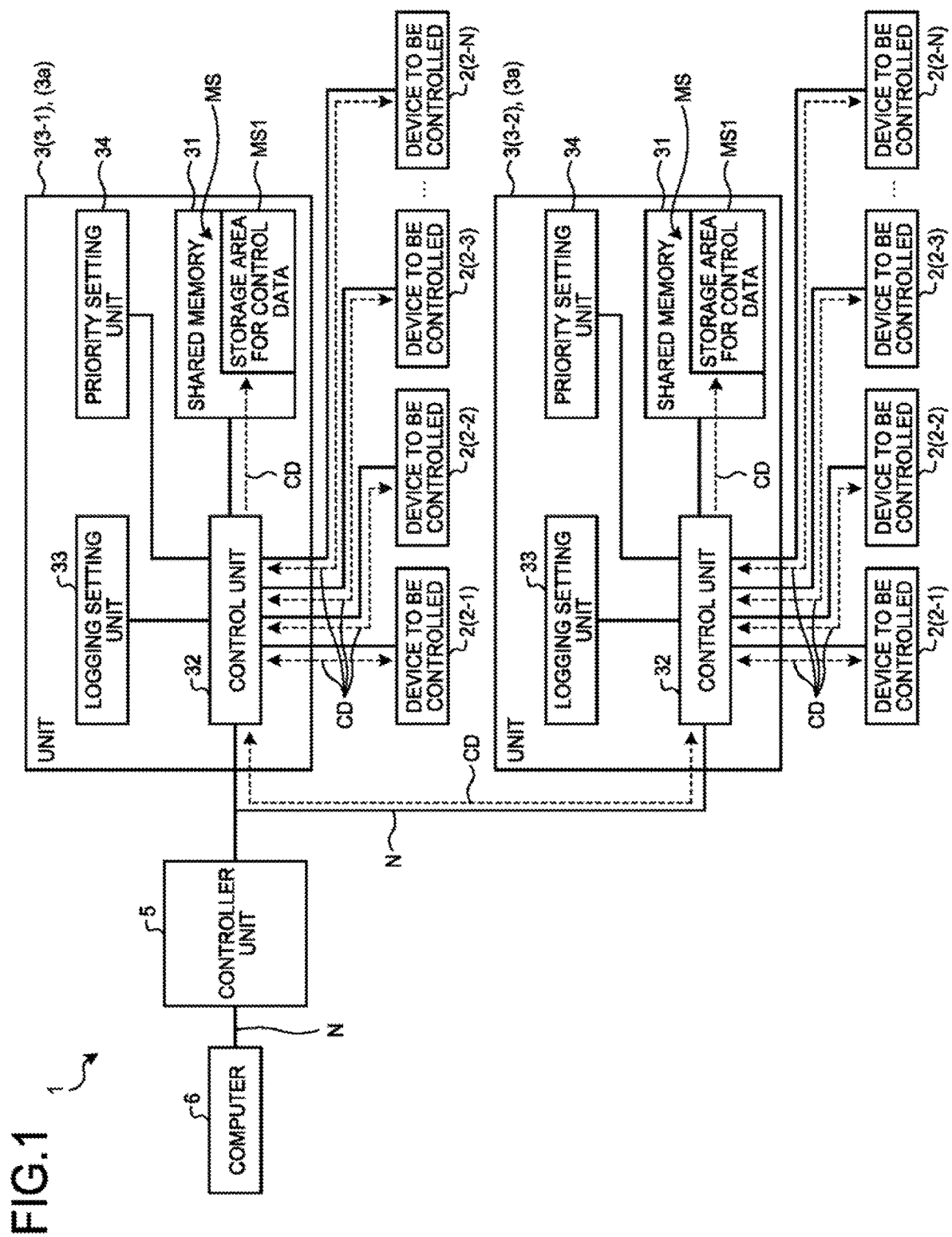
FIG. 1 is a diagram illustrating a configuration of a control system according to a first embodiment.

FIG. 1 is a diagram illustrating a configuration of a control system according to a first embodiment. A control system 1 constitutes the facilities in the FA field. As illustrated in FIG. 1, the centred system 1 includes a unit 3 connected to one or more devices 2 to be controlled that are control-target devices, a controller unit 5 connected to the unit 3, and a computer 6 connected to the controller unit 5. The computer 6 is a peripheral device of the control system 1 and is, for example, a personal computer. The control system 1 is a so-called "distributed control system" in which the unit 3 is located in a distributed manner in the facilities in the FA field.

The devices 2 to be controlled are installed in the facilities in the FA field. Each of the devices 2 to be controlled is a sensor that converts a physical amount to an electrical signal, or a drive device that, converts a control signal to an electrical signal in accordance with the physical amount. An example of the sensor is a sensor that is installed in the facilities to detect whether there is contact, and to detect a displacement, a flow rate, a pressure, or a temperature. An example of the drive device is a drive device that is installed in the facilities to operate as a switch, a regulating valve, a solenoid valve, a motor, an inverter, or a pump.

The control system 1 obtains and stores control data CD, which is related to the devices 2 to be controlled connected to each unit 3 and which is illustrated by a dotted line in FIG. 1. In the specification of the present invention, obtaining and storing control data CD is referred to as "logging". In a case where the device 2 to be controlled is the sensor described above, the control data CD is a detection result from the sensor. In a case where the device 2 to be controlled is the drive device described above, the control data CD is a control signal for controlling the operation of the device 2 to be controlled, and diagnostic information regarding the drive device. That is, the detection result, the control signal, and the diagnostic information are collectively referred to as "control, data CD". The control signal is a signal, for controlling the operation of the device 2 to be controlled. The diagnostic information is information indicating whether the operational status of the device 2 to be controlled that is the drive device is normal or abnormal.

The control system 1 includes a plurality of units 3. The units 3 are connected to each other to be capable of communicating with each other. While the control system 1 includes two units 3 in the first embodiment, the number of the units 3 is not limited to two. In the first embodiment, when the two units 3 are distinguished from each other, one of the units 3 is denoted by a reference sign 3-1, while the other unit 3 is denoted by a reference sign 3-2. When the two units 3 are not distinguished from each other, the units 3 are denoted by a reference sign 3. The unit 3-2 refers to "unit" described in the original claim 1, claim 2, and claim 3, and also refers to "own unit" described in the original claim 4. The unit 3-1 refers to "another unit" described in the original claim 1, claim 2, and claim 4. Each unit 3 is connected to N devices 2 to be controlled, where N is a natural number. That is, the unit 3-2 is connected to both the unit 3-1 and one or more devices 2 to be controlled. In the first embodiment, when the devices 2 to be controlled are distinguished from each other, these devices 2 to be controlled are denoted by reference signs 2-1, 2-2, 2-3, . . . , and 2-N, respectively. When the devices 2 to be controlled are not distinguished from each other, these devices 2 to be controlled are denoted by a reference sign 2.

The computer 6 creates a control program to be executed by the controller unit 5, and transmits the control program to the controller unit 5. The controller unit 5 executes the control program to control the devices 2-1, 2-2, 2-3, . . . , and 2-N to be controlled through each of the units 3-1 and 3-2. The controller unit 5 executes the control program to generate a signal for controlling the devices 2-1, 2-2, 2-3, . . . , and 2-N to be controlled in accordance with the control program. By transmitting the generated signal to each of the units 3-1 and 3-2, the controller unit 5 controls the devices 2-1, 2-2, 2-3, . . . , and 2-N to be controlled connected to each of the units 3-1 and 3-2. In the first embodiment, the controller unit 3 is a Programmable Logic Controller (PLC). The PLC is as defined by the Japanese Industrial Standards (JIS) B 3502:2011.

FIG. 2 is a diagram illustrating an example in which each unit is assigned with a number in the control system according to the first embodiment. FIG. 3 is a diagram illustrating an example in which devices to be controlled in each individual unit are individually assigned with a number in the control system according to the first embodiment.

The control system 1 manages the units 3-1 and 3-2 that constitute the control system 1 by assigning a number to each of the units 3-1 and 3-2. In the first embodiment, as illustrated in FIG. 2, the control system 1 manages the units 3-1 and 3-2 by assigning these units 3-1 and 3-2 with a natural number that, begins from 1 and increases one by one. The control system 1 prioritizes the devices 2 to be controlled in terms of logging the control data CD related to each of the devices 2-1, 2-2, 2-3, . . . , and 2-N to be controlled connected to the units 3-1 and 3-2.

The control system 1 manages the devices 2-1, 2-2, 2-3, . . . , and 2-N to be controlled connected to each of the units 3-1 and 3-2 by individually assigning a number to the devices 2-1, 2-2, 2-3, . . . , and 2-N to be controlled in each individual unit 3-1, 3-2. In the first embodiment, as illustrated in FIG. 3, the control system 1 manages the devices 2-1, 2-2, 2-3, . . . , and 2-N to be controlled connected to each of the units 3-1 and 3-2 by individually assigning a natural number that begins from 1 and increases one by one to these devices 2-1, 2-2, 2-3, . . . , and 2-N to be controlled in each individual unit 3-1, 3-2. The control system 1 assigns a smaller number to the device 2 to be controlled with a higher priority, and assigns a larger number to the device 2 to be controlled with a lower priority for logging the control data CD among the devices 2-1, 2-2, 2-3, . . . , and 2-N to be controlled.

FIG. 4 is a diagram illustrating a hardware configuration of the computer in the control system according to the first embodiment. The computer 6 according to the first embodiment executes computer programs. As illustrated in FIG. 4, the computer 6 includes a Central Processing Unit (CPU) 61, a Random Access Memory (RAM) 62, a Read Only Memory (ROM) 63, a storage device 64, an input, device 65, a display device 66, and a communication interface 67. The CPU 61, the RAM 62, the ROM 63, the storage device 64, the input device 65, the display device 66, and the communication interface 67 are connected to each other through a bus B6.

By using the RAM 62 as a workarea, the CPU 61 executes programs stored in the ROM 63 and the storage device 64. The program stored in the ROM 63 is a Basic Input/Output System (BIOS), or a Unified Extensible Firmware Interface (UEFI). However, the program stored in the ROM 63 is not limited to the BIOS or the UEFI. In the first embodiment, the programs stored in the storage device 64 are an operating system program and an engineering tool program. However, the programs stored in the storage device 64 are not limited to the operating system program or the engineering tool program. In the first, embodiment, the storage device 64 is a Solid State Drive (SSD) or a Hard Disk Drive (HDD). However, the storage device 64 is not limited to the SSD or the HDD.

The input device 65 receives an operational input from a user. In the first embodiment, the input device 65 is a keyboard or a mouse. However, the input, device 65 is not limited to the keyboard or the mouse. The display device 66 displays characters and images. In the first embodiment, the display device 66 is a liquid crystal display device. However, the display device 66 is not limited to the liquid crystal display device. The communication interface 67 communicates with the controller unit 5 through a network N. The network N is a computer network that connects the computer 6, the controller unit 5, and the units 3-1 and 3-2 to each other to be capable of communicating with each other. In the first embodiment, the network N is installed in the FA facilities. The network N can use the Ethernet® system or serial communication defined by RS-232C, serial communication defined by RS-422, or serial communication defined by RS-485. However, the network system is not limited thereto. RS-232C, RS-422, and RS-485 standards are the Electronic Industries Association (ETA) communication standards.

The computer 6 assigns a number to each of the units 3-1 and 3-2, and assigns a number to each of the devices 2-1, 2-2, 2-3, . . . , and 2-N to be controlled in each individual unit 3-1, 3-2, on the basis of a user's operational input received by the input device 65, and the engineering tool program.

In the first embodiment, two units 3 are identical in configuration, and thus like parts are denoted by like reference signs in the following descriptions. The unit 3 receives a signal transmitted by the controller unit. 5 by executing the control program, generates a control signal that, serves as the control data CD, and transmits the generated control signal to the device 2 to be controlled that is a drive device. The unit 3 receives a detection result that is the control data CD related to the device 2 to be controlled that is a sensor. The unit 3 is a so-called "remote unit" that connects to the other unit 3 through the network N, transmits a control signal to the device 2 to be controlled, and receives a detection result from the device 2 to be controlled, that is, transmits and receives the control data CD between the unit 3 and the device 2 to be controlled.

As illustrated in FIG. 1, the unit 3 includes a shared memory 31 that is a storage unit including a storage area MS where it is possible to store information readable by the computer 6, and a control unit 32 that connects to the devices 2 to be controlled connected to its own unit 3. Its own unit 3 refers to "own unit" described in the original claims, and is hereinafter denoted by a reference sign 3a.

FIG. 5 is a diagram illustrating an example of logging setting information that is set in a logging setting unit within the unit in the control system according to the first embodiment. FIG. 6 is a diagram illustrating an example of logging priority information that is set in a priority setting unit within the unit in the control system according to the first embodiment.

The unit 3 includes a logging setting unit 33 and a priority setting unit 34. Logging setting information SI (illustrated in FIG. 5) which indicates whether to log the control data CD related to each device 2 to be controlled in the entire control system 1 is set in the logging setting unit 33. Logging priority information PI (illustrated in FIG. 6) which is a logging priority given to each of the devices 2 to be controlled in the entire control system 1 is set in the priority setting unit 3A.

In the control system 1, the storage area MS of the shared memory 31 is shared between its own unit 3a and the other unit 3. The control unit 32 generates a control signal for controlling the device 2 to be controlled on the basis of a signal received from the controller unit 5, and transmits the generated control signal to the device 2 to be controlled. The control unit 32 receives a detection result from the device 2 to be controlled.

The logging setting information SI illustrated in FIG. 5 is set in the logging setting unit 33 by the control unit 32 through the computer 6. The logging setting information SI illustrated in FIG. 5 is information to set whether to enable or disable logging for the devices 2 to be controlled in the entire control system 1. In the first embodiment, the logging setting information SI sets logging to enabled for the devices 2-1 and 2-3 to be controlled in the unit 3-1, that is, sets logging of the control data CD related to the devices 2-1 and 2-3 to be controlled in the unit 3-1. Simultaneously, the logging setting information SI sets logging to disabled for the devices 2-2 and 2-N to be controlled in the unit 3-1, that is, stops logging of the control data CD related to the devices 2-2 and 2-N to be controlled in the unit 3-1. The logging setting information SI illustrated In FIG. 5 sets logging to enabled for the device 2-2 to be controlled in the unit 3-2, that is, sets logging of the control data CD related to the device 2-2 to be controlled in the unit 3-2.

Simultaneously, the logging setting information SI sets logging to disabled for the devices 2-1, 2-3, and 2-N to be controlled in the unit 3-2, that is, stops logging of the control data CD related to the devices 2-1, 2-3, and 2-N to be controlled in the unit 3-2.

The condition to start, logging the control data CD received from the device 2 to be controlled, for which logging has been set to enabled, is set by the control unit 32. The set logging start condition is stored in the logging setting unit 33.

The logging priority information PI illustrated in FIG. 6 is set in the priority setting unit 34 by the control unit 32 through the computer 6. The logging priority information PI illustrated in FIG. 6 is information to set a priority for logging the control data CD related to each of the devices 2 to be controlled in the entire control system 1. In the first embodiment, the logging priority information PI sets the highest priority to the device 2-1 to be controlled in the unit 3-1 for logging of the control data CD among the devices 2-2 and 2-3 to be controlled in the unit 3-1 and the device 2-2 to be controlled in the unit 3-2. Simultaneously, the logging priority information PI sets the second highest priority to the device 2-2 to be controlled in the unit 3-2, while setting the lowest priority to the device 2-3 to be controlled in the unit 3-1.

On the basis of the logging priority information PI illustrated in FIG. 6, the control unit 32 sets a storage area MS1 for storing the control data CD in an available area of the storage area MS of one or more shared memories 31 within the total available area of the storage areas MS of the shared memories 31 in the entire control system 1. In the first embodiment, the control unit 32 stores the control data CD related to the device 2 to be controlled with a higher priority in the available area of the shared memory 31 prior to the control data CD related to the device 2 to be controlled with a lower priority.

In a case where the total capacity of the available area of the storage areas MS in the shared memories 31 in the entire control, system 1 is sufficient to store all the logged control data CD related to the devices 2 to be controlled, the control unit 32 sets the storage area MS1 so as to store therein all the logged control data CD related to the devices 2 to be controlled. In a case where the total capacity of the available area of the storage areas MS in the shared memories 31 in the entire control system 1 is insufficient to store ail the logged control data CD related to the devices 2 to be controlled, the control unit 32 sets the storage area MS1 so as not to store the control data CD related to the device 2 to be controlled in order of lowest priority in the shared memory 31. The available area is an area of the storage area MS in the shared memory 31, where it is possible to store the control data CD.

In the first embodiment, the logging setting information SI is generated by the computer 6 by receiving an operational input from a user. The logging setting information SI generated by the computer 6 is transmitted to each unit 3 through the network N. In a case where at least one of the unit 3 and the device 2 to be controlled that constitute the control system 1 is changed in configuration, the computer 6 transmits information indicating the configuration change to each unit 3 through the network N. At the initial start-up of the control system 1, the computer 6 transmits information indicating the initial start-up to each unit 3 through the network N.

In the first embodiment, the logging priority information PI is generated by the control unit 32 in each unit 3. It is also permissible that the logging priority information PI is generated by the computer 6 by receiving an operational input from a user. The logging setting information SI and the logging priority information PI are stored in all the units 3 that constitute the control system 1. All the units 3 that constitute the control system 1 store therein identical logging setting information SI, and identical, logging priority information PI.

The controller unit 5 in the control system 1 transmits a trigger signal for starting reception of the control data CD related to the devices 2 to be controlled to the control unit 32 in each unit 3. The controller unit 5 does not necessarily transmit a trigger signal to the control unit 32 in each unit 3 each time the control unit 32 receives the control data CD. It is permissible that the controller unit 5 transmits a trigger signal at a given timing. The given timing refers to the time when the storage area MS1 for storing the control data CD related to each device 2 to be controlled is set before the logging start, the time when the storage area MS1 is changed, or the time when the control data CD stored in the shared memory 31 is referenced.

Figure 7:
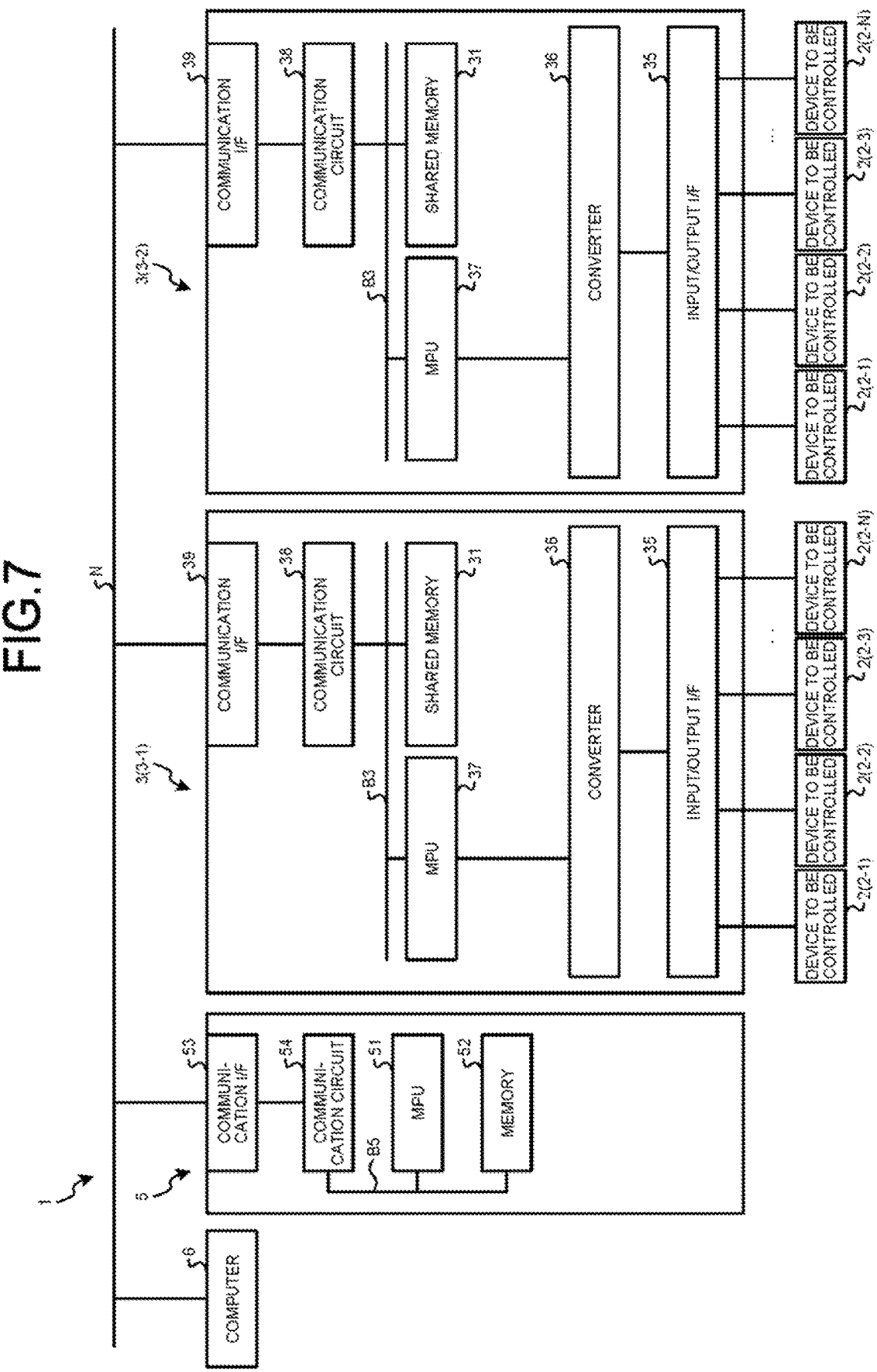
FIG. 7 is a diagram illustrating a hardware configuration of a controller unit and each unit in the control system according to the first embodiment.

FIG. 7 is a diagram illustrating a hardware configuration of the controller unit and each unit in the control system according to the first embodiment. As illustrated in FIG. 7, the controller unit 5 in the control system 1 includes a Micro-Processing Unit (MPU) 51 that executes a control program, and a memory 52 that stores therein the control program. The controller unit 5 includes a communication circuit. 54 connected to the network N through a communication interface 53. The MPU 51, the memory 52, and the communication circuit 54 are connected to each other through an internal bus B5.

The functions of the controller unit 5 are implemented by the MPU 51 by reading and executing the control program stored in the memory 52. The control program is a computer program readable by a computer, and is implemented by software, firmware, or a combination of software and firmware. The memory 52 includes a storage area in which the control program or data can be stored. The memory 52 is configured by a nonvolatile semiconductor memory or a volatile semiconductor memory. As a nonvolatile semiconductor memory or a volatile semiconductor memory, a RAM, a ROM, a flash memory, an Erasable Programmable Read Only Memory (EPROM), or an Electrically Erasable Programmable Read Only Memory (EEPROM) can be used. It is also permissible that the memory 52 is configured by at least one of a magnetic disk, an optical disk, and a magneto-optical disk.

The communication circuit 54 is implemented by a single circuit, a combined circuit, a programmed processor, a parallel-programmed processor, an Application Specific Integrated Circuit (ASIC), a Field-Programmable Gate Array (FPGA), or a combination of two or more of these devices.

As illustrated in FIG. 7, each of the unite 3 includes an input/output interface 35 connected to the devices 2 to be controlled, and a converter 36 connected to the input/output interface 35. Each of the units 3 includes an MPU 37 that stores therein a computer program, the shared memory 31, a communication circuit 38, and a communication interface 38 connected to the network 14. The MPU 37, the shared memory 31, and the communication circuit 33 are connected to each other through an internal bus 83.

The converter 36 is also connected to the MPU 37. The converter 36 is implemented by an Analog/Digital (A/D) converter that converts an analog signal of signals transmitted and received between the MPU 37 and the devices 2 to be controlled to a digital signal, by a Digital/Analog (D/A) converter that converts a digital signal to an analog signal, or by a digital Input/Output (I/O). The communication circuit 33 is connected to the communication interface 39.

The functions of the control unit 32 in the unit 3 are implemented by the MPU 37 by executing a computer program. The computer program is implemented by firmware. The memory 31 is configured by a nonvolatile semiconductor memory or a volatile semiconductor memory. As a nonvolatile semiconductor memory or a volatile semiconductor memory, a RAM, a ROM, a flash memory, an EPROM, or an EEPROM can be used. It is also permissible that the memory al is configured by at least one of a magnetic disk, an optical disk, and a magneto-optical disk.

The control unit 32 in the unit 3 has a function of setting the logging setting information SI, and a function of setting the logging start condition. These functions are implemented by the MPU 37 by executing the computer program. The control unit 32 in the unit 3 has a function of generating the logging priority information PI. This function is implemented by the MPU 37 by executing the computer program. The functions of the logging setting unit 33 and the priority setting unit 34 are implemented in the storage area of the shared memory 31.

The communication circuit 36 is implemented by a single circuit, a combined circuit, a programmed processor, a parallel-programmed processor, an ASIC, a FPGA, or a combination of two or more of these devices. Each unit 3 includes a timer circuit, (not illustrated) configured by a circuit that calculates an elapsed time, which is reset to zero by the control unit 32.

Figure 8:
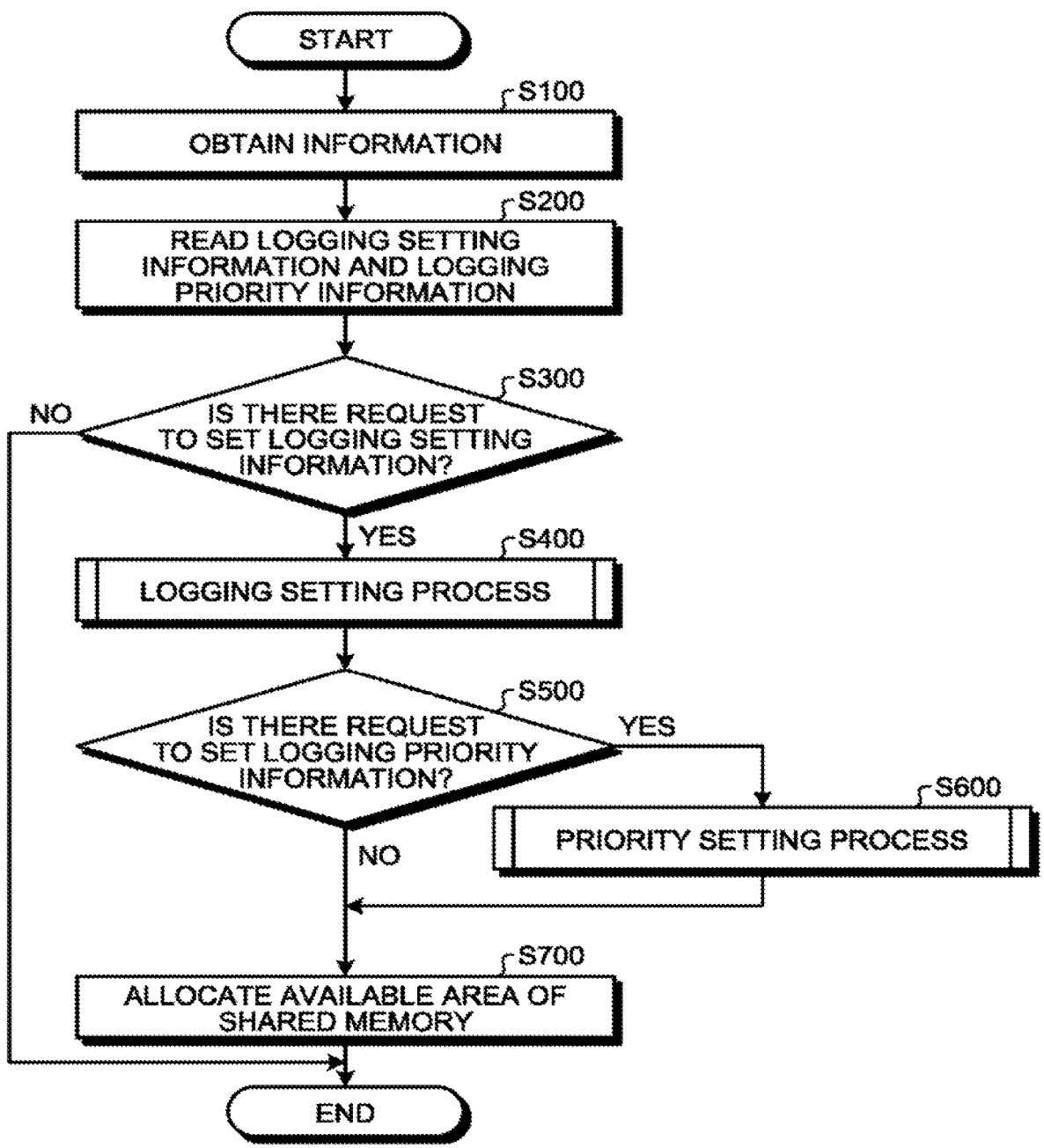
FIG. 8 is a flowchart, for explaining an operation to allocate a storage area of a shared memory for storing control data related to the control system according to the first embodiment.

Next, there is described an operation to allocate the storage area MS of the shared memory 31 for storing control data CD related to each device 2 to be controlled in the control system according to the first embodiment. FIG. 8 is a flowchart for explaining an operation to allocate the storage area of the shared memory for storing control data related to the control system according to the first embodiment.

In the first embodiment, the flowchart illustrated in FIG. 8 is executed by the control unit 32 in each unit 3 when at least one of the unit 3 and the device 2 to be controlled that constitute the control system 1 is changed in configuration, or at the initial start-up of the control system 1. However, the timing to execute the flowchart is not limited thereto. It is also permissible that the flowchart illustrated in FIG. 8 is executed by the control unit 32 in each unit 3 when at least one of the logging setting information SI and the logging priority information PI is changed by the computer 6.

The control unit 32 in each unit 3 obtains information indicating the configuration of the control system 1 from the controller unit 5 upon receiving information which indicates a change in the configuration of at least one of the unit 3 and the device 2 to be controlled that constitute the control system 1, or information which indicates the initial start-up from the computer 6 (Step S100). The information obtained by the control unit 32 in each unit 3 includes the number M of the units that are connected to the controller unit 5, the number N of the devices 2 to be controlled that are connected to each unit 3, and the capacity of an available area of the shared memory 31 in each unit 3. In the first embodiment, at Step S100, the control unit 32 in each unit 3 obtains the number assigned to each unit 3, and the number assigned to each device 2 to be controlled as well as the capacity of the available area of the shared memory 31 in each unit 3. In the first embodiment, the number N of the devices 2 to be controlled differs in each unit 3, and thus is defined hereinafter as N[M]. For example, the number of the devices 2 to be controlled connected to the unit 3-2 is defined as N[2]. In the first embodiment, the units 3-1 and 3-2 both include N devices 2 to be controlled.

The control unit 32 in each unit 3 reads the logging setting information SI from the logging setting unit 33 in its own unit 3a, and reads the logging priority information PI from the priority setting unit 34 in its own unit 3a (Step S200). The control unit 32 in each unit 3 determines whether there is a request to set the logging setting information SI (Step S300). In the first embodiment, the control unit 32 in each unit 3 determines that there is a request to set the logging setting information SI when at least ene of the unit 3 and the device 2 to be controlled that constitute the control system 1 is changed in configuration, or at the initial start-up of the control system 1 (YES at Step S300). The control unit 32 in each unit 3 determines that there is not a request to set the logging setting information SI when at least one of the unit 3 and the device 2 to be controlled that constitute the control system 1 is not changed in configuration, or when it is not the initial start-up of the control system 1 (NO at Step S300).

When the control unit 32 in each unit 3 determines that, there is not a request, to set the logging setting information SI (NO at Step S300), the flowchart illustrated in FIG. 8 is ended. When the control unit 32 in each unit 3 determines that, there is a request to set the logging setting information SI (YES at Step S300), then the control unit 32 performs a logging setting process (Step S400). Thus, the logging setting information SI is set in the logging setting unit 33.

After having performed the logging setting process (Step S400), the control, unit 32 in each unit 3 determines whether there is a request, to set the logging priority information PI (Step S500). In the first embodiment, the control unit 32 in each unit 3 determines that there is a request, to set the logging priority information PI when at least one of the unit 3 and the device 2 to be controlled that constitute the control, system 1 is changed in configuration, or at the initial start-up of the control system 1 (YES at Step S500). The control unit 32 in each unit 3 determines that there is not a request to set the logging priority information PI when at least one of the unit 3 and the device 2 to be controlled that constitute the control system 1 is not changed in configuration, or when it is not the initial start-up of the control system 1 (NO at Step S500).

When the control unit 32 in each unit 3 determines that there is a request to set the logging priority information PI (YES at Step S500), then the control unit 32 performs a priority setting process (Step S600). Thus, the logging priority information PI is set in the priority setting unit 34. After having determined that there is not a request to set the logging priority information PI (NO at Step S500), or after having performed the priority setting process (Step S600), the control unit 32 in each unit 3 performs a process of allocating the available area of the shared memory 31, that is, a process of setting the storage area MS1 (Step S700).

At Step S700, on the basis of the logging setting information SI and the logging priority information PI, the control unit 32 in each unit 3 sets the total available area of the shared memories 31 in all the units 3 in the control system 1 as the storage area MS1 for storing the control data CD related to each device 2 to be controlled. In the first embodiment, when at least one of the unit 3 and the device 2 to be controlled that constitute the control system 1 is changed in configuration, or at the initial start-up of the control system 1, the control unit 32 in each unit 3 sets the total available area as the storage area MS1 on the basis of the logging setting information SI and the logging priority information PI.

Figure 9:
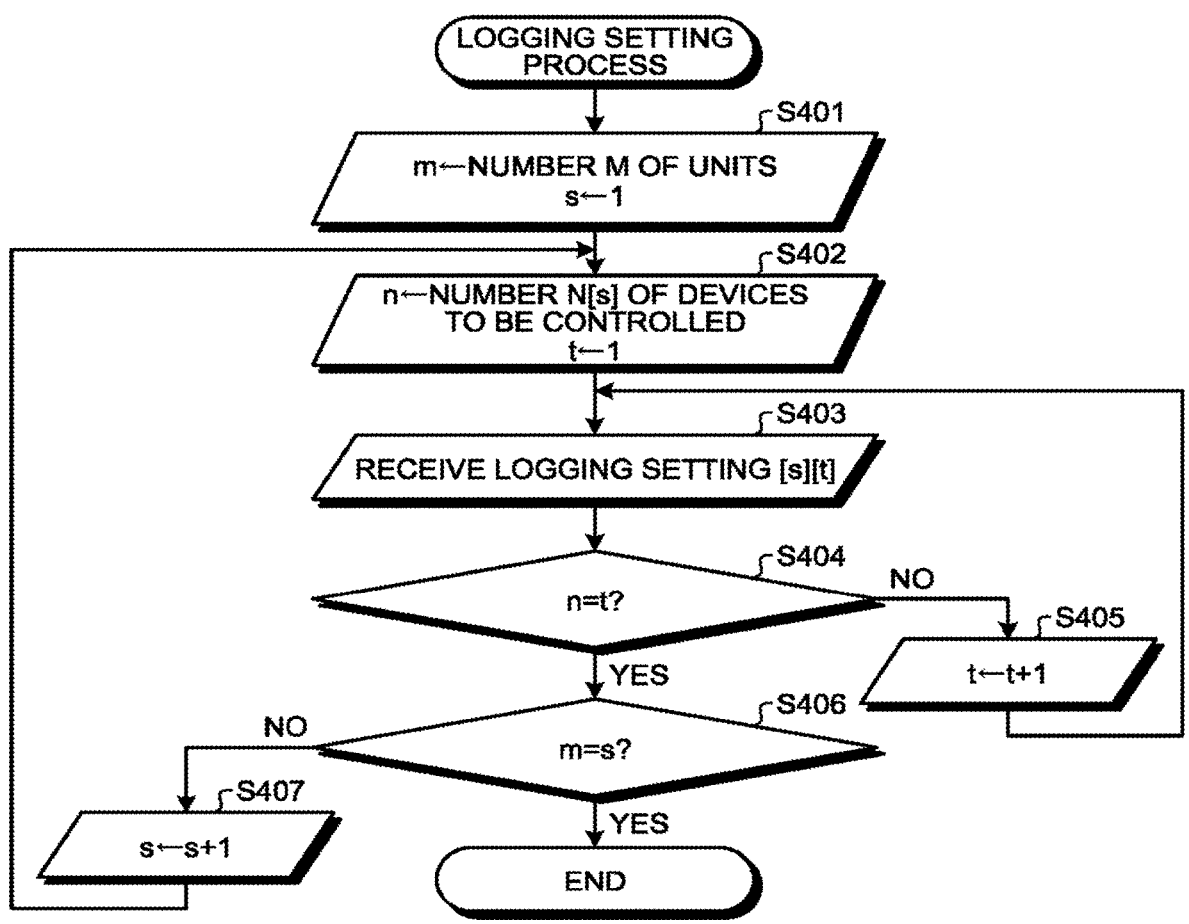
FIG. 9 is a flowchart for explaining a logging setting process at Step S400 illustrated in FIG. 8.

Next, the logging setting process to be performed by the control unit 32 in each unit 3 at Step S400 is explained. FIG. 9 is a flowchart for explaining the logging setting process at Step S400 illustrated in FIG. 8.

In the logging setting process, the control unit 32 in each unit 3 uses the number M of the units 3 and the numbers N[1] to N[M] of the devices 2 to be controlled that are connected to the respective units 3, which have been obtained at Step S100. The control unit 32 in each unit 3 stores the number M of the units 3 as a temporary variable m, and stores "1" as a temporary variable s that indicates the number assigned to the unit 3 (Step S401). The control unit 32 in each unit 3 stores the number N(s) of the devices 2 to be controlled that are connected to an s-th unit 3 as a temporary variable n, and stores "1" as a temporary variable t that, indicates the number assigned to the device 2 to be controlled connected to the s-th unit 3 (Step S402).

The control unit 32 in each unit 3 receives information which indicates the logging setting for the t-th device 2 to be controlled connected to the s-th unit 3 from the computer 6 (Step S403).

The control unit 32 in each unit 3 determines whether the temporary variable n, which indicates the number N of the devices 2 to be controlled that are connected to the s-th unit 3 that is in the process of logging setting, corresponds with the temporary variable t (Step S404). At Step S404, when the control unit 32 in each unit 3 determines that the temporary variable n, which indicates the number N of the devices 2 to be controlled that are connected to the s-th unit 3 that is in the process of logging setting, does not correspond with the temporary variable t (NO at Step S404), at Step S405, the control unit 32 in each unit 3 receives information which indicates whether logging is enabled or disabled for the t-th device 2 to be controlled connected to the s-th unit 3 from the computer 6. After logging setting at Step S403, the control unit 32 in each unit 3 increments the temporary variable t by "1" (Step S405). The control unit 32 in each unit 3 increments the temporary variable t by "1" at Step S405 in order to perform the logging setting process on the t-th device 2 to be controlled connected to the s-th unit 3. Then the process flow returns to Step S403 to repeat Steps S403 to S405 until the temporary variable n which indicates the number N of the devices 2 to be controlled corresponds with the temporary variable t, so as to perform the logging setting on all the devices 2 to be controlled connected to the s-th unit 3.

When the control unit 32 in each unit 3 determines that the temporary variable n, which indicates the number N of the devices 2 to be controlled that are connected to the s-th unit 3 that is in the process of logging setting, corresponds with the temporary variable t (YES at Step S404), then the control unit 32 assumes that the logging setting for all the devices 2 to be controlled connected to the s-th unit 3 is completed. Thus, the process flow shifts to Step S406.

The control unit 32 in each unit 3 determines whether the temporary variable m, indicating the number M of the units 3 on which the logging setting is perform, corresponds with the temporary variable s (Step S406). When the control unit 32 in each unit 3 determines that the temporary variable in, indicating the number M of the units 3 on which the logging setting is performed, does not correspond with the temporary variable s (NO Step S406), after having completed the logging setting for all the devices 2 to be controlled connected to the s-th unit 3, the control unit 32 initializes the temporary variable t to "1" and increments the temporary variable s by "1" (Step S407). At Step S407, the control unit 32 in each unit 3 initializes the temporary variable t to "1" and increments the temporary variable s by "1", thereby making it possible to perform the logging setting on the devices 2 to be controlled connected to the unit 3 in which the logging setting has not yet been completed. Then the process flow returns to Step S402, the control unit 32 in each unit 3 repeats Steps S402 to S407 until the temporary variable m indicating the number M of the units 3 corresponds with the temporary variable s so as to perform the logging setting on all the devices 2 to be controlled connected to the s-th units 3 that constitute the control system 1. In the first embodiment, the control unit 32 sets the logging setting information SI illustrated in FIG. 5. The logging setting information SI having been set by the control unit 32 is stored in the logging setting unit 33, that is, the shared memory 31 in each unit 3.

When the control unit 32 in each unit 3 determines that the temporary variable m, indicating the number M of the units 3 on which the logging setting is performed, corresponds with the temporary variable s (YES at Step S406), then the control unit 32 assumes that the logging setting for all the devices 2 to be controlled connected to all the units 3 that constitute the control system 1 is completed. Thus, the logging setting process is ended.

Figure 10:
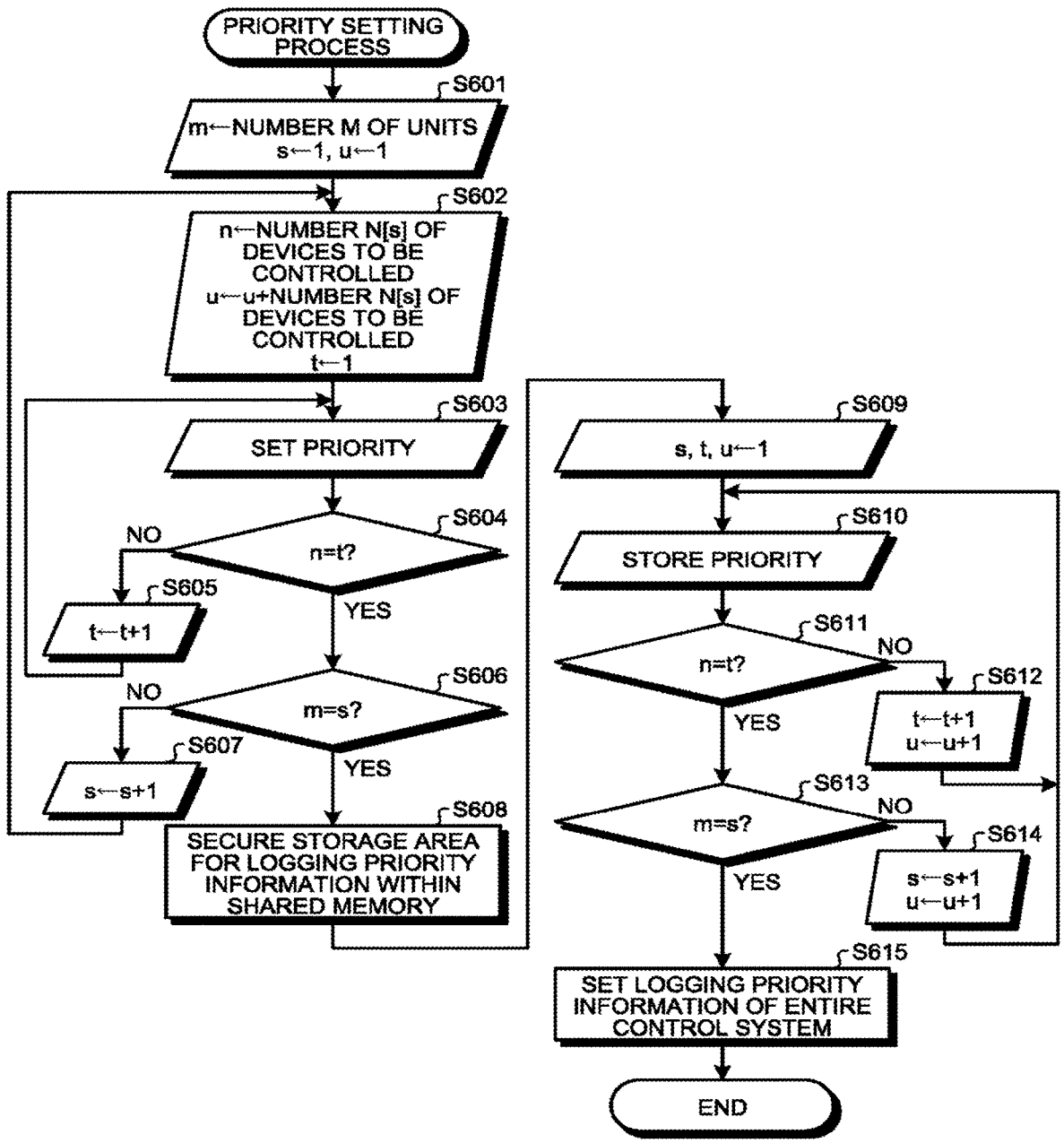
FIG. 10 is a flowchart, for explaining a priority setting process at Step S600 illustrated in FIG. 3.

Next, the priority setting process to be performed by the control unit 32 in each unit 3 at Step S600 is explained. FIG. 10 is a flowchart for explaining the priority setting process at Step S600 illustrated in FIG. 8.

At Step S600, when the logging priority information PI has not yet been set in the priority setting unit 34, any of the control data storage areas in all the shared memories 31 in all the units 3 is selected as a storage location for the control data CD. In the first embodiment, there is no particular limitation on the storage location selection method when priorities have not yet been set. A commonly-known cache algorithm such as Least Recently Used (LRU) can be used.

In the priority setting process, the control unit 32 in each unit 3 stores the number M of the units as the temporary variable m, stores "1" as the temporary variable s that indicates the number assigned to the unit 3, and stores "1" as a temporary variable u (Step S601). The control unit 32 in each unit 3 stores the number N[s] of the devices 2 to be controlled that are connected to the s-th unit 3 as the temporary variable n, adds the number N[s] of the devices 2 to be controlled that are connected to the s-th unit 3 to the temporary variable u, and stores "0" as the temporary variable t that indicates the number assigned to the device 2 to be controlled connected to the s-th unit 3 (Step S602). The control unit 32 in each unit 3 sets a priority to the t-th device 2 to be controlled connected to the s-th unit 3 among all the devices 2 to be controlled connected to the s-th unit 3 (Step S603). In the first embodiment, a priority is set using a natural number such as 1, 2, 3, . . . . A smaller natural number is regarded as a higher priority.

The control unit 32 in each unit 3 determines whether the temporary variable n, indicating the number N of the devices 2 to be controlled that are connected to the s-th unit 3 that is in the process of priority setting, corresponds with the temporary variable t (Step S604). At Step S604, when the control unit 32 in each unit 3 determines that the temporary variable n, which indicates the number N of the devices 2 to be controlled that are connected to the s-th unit 3 that is in the process of priority setting, does not correspond with the temporary variable t (NO at Step S604), after having set the priority at Step S603, the control unit 32 increments the temporary variable t by "1" (Step S605). The control unit 32 in each unit 3 increments the temporary variable t by "1" at Step S605 in order to perform the priority setting process on the t-th device 2 to be controlled connected to the s-th unit 3. Then the process flow returns to Step S603, the control unit 32 in each unit 3 repeats Steps S603 to S605 until the temporary variable n which indicates the number N of the devices 2 to be controlled corresponds with the temporary variable t, so as to perform the priority setting on all the devices 2 to be controlled connected to the s-th unit 3.

When the control unit 32 in each unit 3 determines that the temporary variable n, which indicates the number N of the devices 2 to be controlled that are connected to the s-th unit 3 that is in the process of priority setting, corresponds with the temporary variable t (YES at Step S604), then the control unit 32 assumes that the priority setting for all the devices 2 to be controlled connected to the s-th unit 3 is completed. Thus, the process flow shifts to Step S606.

The control unit 32 in each unit 3 determines whether the temporary variable m, indicating the number M of the units 3 on which the priority setting is performed, corresponds with the temporary variable s (Step S606). When the control unit 32 in each unit 3 determines that the temporary variable m, indicating the number M of the units 3 on which the priority setting is performed, does not correspond with the temporary variable s (NO at Step S606), after having completed the priority setting for all the devices 2 to be controlled connected to the s-th unit 3, the control unit 32 initializes the temporary variable t to "1" and increments the temporary variable s by "1" (Step S607). At Step S607, the control unit 32 in each unit 3 initializes the temporary variable t to "1" and increments the temporary variable s by "1", thereby making it possible to perform the priority setting on the devices 2 to be controlled connected to the unit 3 in which the priority setting has not yet been completed. Then the process flow returns to Step S602, the control unit 32 in each unit 3 repeats Steps S602 to S607 until the temporary variable m indicating the number M of the units 3 corresponds with the temporary variable s so as to perform the priority setting on all the devices 2 to be controlled connected to each unit 3 for each s-th unit 3 that constitutes the control system 1.

When the control unit 32 in each unit 3 determines that the temporary variable in, indicating the number M of the units 3 on which the priority setting is performed, corresponds with the temporary variable s (YES at Step S606), then the control unit 32 assumes that the priority setting for all the devices 2 to be controlled connected to each unit 3 for each s-th unit 3 that constitutes the control system 1 is completed. In the first embodiment, logging priority information PI-1 and PI-2 illustrated respectively in FIGS. 11 and 12 is set for each individual unit 3 in the priority setting unit 34 by the control unit 32.

FIG. 11 is a diagram illustrating logging priority information of devices to be controlled connected to one of the units in the control system according to the first embodiment. FIG. 12 is a diagram illustrating logging priority information of devices to be controlled connected to the other unit in the control system according to the first embodiment. The logging priority information PI-1 illustrated in FIG. 11 indicates that a priority "1" is given to the device 2-1 to be controlled connected to the unit 3-1, while a priority "2" is given to the device 2-3 to be controlled connected to the unit 3-1. The logging priority information PI-2 illustrated in FIG. 12 indicates that a priority "1" is given to the device 2-2 to be controlled connected to the unit 3-2.

When the control unit 32 in each unit 3 assumes that priority setting for all the devices 2 to be controlled connected to each unit 3 for each s-th unit 3 is completed at Step S606, then the process flow shifts to Step S608.

At Step S608 and subsequent steps, the logging priority information PI-1 and the legging priority information PI-2 for each individual unit 3, which have been set at Steps S601 to S607, are merged to set the logging priority information PI of the entire control system 1. First, the control unit 32 in each unit 3 uses the temporary variable u obtained at Steps S602 to S607 to secure the storage area MS for storing the logging priority information PI-1 and PI-2 for each individual unit 3 in the shared memory 31 of its own unit 3a (Step S608). Because the temporary variable u is equal to the number of the devices 2 to be controlled in the entire control system 1 at Step S608, the control unit 32 in each unit 3 can secure the storage area MS where it is possible to store the logging priority information PI-1, and PI-2 that, indicates priorities given to all the devices 2 to be controlled in the control system 1.

The control unit 32 in each unit 3 initializes the temporary variable s, the temporary variable t, and the temporary variable u to "0" (Step S609). The control unit 32 in each unit 3 stores a priority in each individual unit 3, which is given to the t-th device 2 to be controlled connected to the s-th unit 3, in the secured storage area MS of the shared memory 31 (Step S610).

The control unit 32 in each unit 3 determines whether the temporary variable n, indicating the number N of the devices 2 to be controlled that are connected to the s-th unit 3 having stored therein a priority given to each device 2 to be controlled, corresponds with the temporary variable t (Step S611). At Step S611, when the control unit 32 in each unit 3 determines that the temporary variable n, which indicates the number N of the devices 2 to be controlled that are connected to the s-th unit 3 having stored therein a priority given to each device 2 to be controlled, does not correspond with the temporary variable t (NO at Step S611), the control unit 32 increments both the temporary variable t and the temporary variable u by "1" in order to store a priority in each individual unit 3, which is given to the next device 2 to be controlled connected to the s-th unit 3, in the secured storage area MS of the shared memory 31 (Step S612). Then the process flow returns to Step S610, the control unit 32 in each unit 3 repeats Steps S610 to S612 until the temporary variable n which indicates the number N of the devices 2 to be controlled corresponds with the temporary variable t so as to store the priorities given to all the devices 2 to be controlled connected to the s-th unit 3.

When the control unit 32 in each unit 3 determines that the temporary variable n, which indicates the number N of the devices 2 to be controlled that are connected to the s-th unit 3 having stored therein a priority given to each device 2 to be controlled, corresponds with the temporary variable t (YES at Step S612), then the control unit 32 assumes that storing of the priorities given to all the devices 2 to be controlled connected to the s-th unit 3 is completed. Thus, the process flow shifts to Step S613.

The control unit 32 in each unit 3 determines whether the temporary variable m which indicates the number M of the units 3 corresponds with the temporary variable s (Step S613). When the control unit 32 in each unit 3 determines that the temporary variable in which indicates the number M of the units 3 on which the priority setting is performed, does not correspond with the temporary variable s (NO at Step S613), the control unit 32 initializes the temporary variable t to "1" and increments both the temporary variable s and the temporary variable u by "1" (Step S614). At Step S614, the control unit 32 in each unit 3 initializes the temporary variable t to "1" and increments both the temporary variable s and the temporary variable u by "1", thereby making it possible to store priorities given to the devices 2 to be controlled connected to the unit 3 for which storing of the priorities in each individual unit 3 is not completed. Then the process flow returns to Step S610, the control unit 32 in each unit 3 repeats Steps S610 to S614 until the temporary variable in indicating the number M of the units 3 corresponds with the temporary variable s so as to store, in the storage area MS of the shared memory 31, the logging priority information PI-1 and PI-2 illustrated respectively in FIGS. 11 and 12 for each individual unit 3 that constitutes the control system 1. The logging priority information PI-1 and PI-2 stored in the shared memory 31 at Step S614 only indicates priorities given to the devices 2 to be controlled in each individual unit 3, and does not indicate priorities given to all the devices 2 to be controlled in the entire control system 1.

When the control unit 32 in each unit 3 determines that the temporary variable m indicating the number M of the units 3 corresponds with the temporary variable s (YES at Step S613) the process flow shifts to Step S615. The control unit 32 in each unit 3 rearranges all the devices 2 to be controlled, each of which has been given a priority indicated in the logging priority information PI-1 and PI-2 for each individual unit 3, in order of priority in the entire control system 1. The control unit 32 in each unit 3 sets the logging priority information PI in the entire control system 1 illustrated in FIG. 6, and stores this logging priority information PI in the priority setting unit 34, that is, the shared memory 31 in its own unit 3a (Step S615). In the first embodiment, the control unit 32 in each unit 3 rearranges the devices 2 to be controlled in order of priority with a smaller number indicating a higher priority in accordance with the logging priority information PI-1 and PI-2 for each individual unit 3. In a case where there are the devices 2 to be controlled with an identical priority between the logging priority information PI-1 and the logging priority information PI-2 for each individual unit 3, the control unit 32 in each unit 3 rearranges the devices 2 to be controlled by giving a higher priority to the device 2 to be controlled connected to the unit 3 assigned with a smaller number. It is permissible that the control unit 32 in each unit 3 individually sets a priority to each device 2 to be controlled in accordance with a user's operational input received by the computer 6, and sets individual logging priority information PI.

In the first embodiment, in the logging priority information PI-1, a priority "1" is given to the device 2-1 to be controlled connected to the unit 3-1, while in the logging priority information PI-2, a priority "1" is given to the device 2-2 to be controlled connected to the unit 3-2. Thus, the control unit 32 in each unit 3 regards the device 2-1 to be controlled connected to the unit 3-1 as the device 2 to be controlled with a priority "1" in the entire control system 1, while regarding the device 2-2 to be controlled connected to the unit 3-2 as the device 2 to be controlled with a priority "2" in the entire control system 1. The control unit 32 in each unit 3 regards the device 2-3 to be controlled connected to the unit 3-1 as the device 2 to be controlled with a priority "3" in the entire control system 1.

Figure 13:
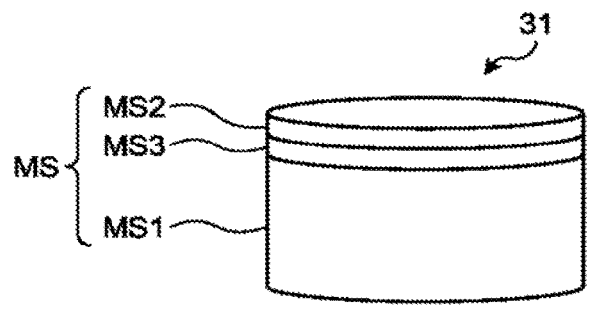
FIG. 13 is a diagram illustrating a storage area of the shared memory in each unit in the control system according to the first embodiment.

Accordingly, in the first embodiment, the storage area MS of the shared memory 31 in each unit 3 includes a storage area MS2 for storing the logging setting information SI, and a storage area MS3 for storing the logging priority information PI as illustrated in FIG. 13. FIG. 13 is a diagram illustrating a storage area of the shared memory in each unit, in the control system according to the first embodiment. FIG. 13 illustrates an example in which each unit 3 has an equal capacity of the available area of the storage area MS within the shared memory 31 obtained at Step S100. However, it is permissible that each unit 3 does not have an equal capacity of the available area.

Figure 14:
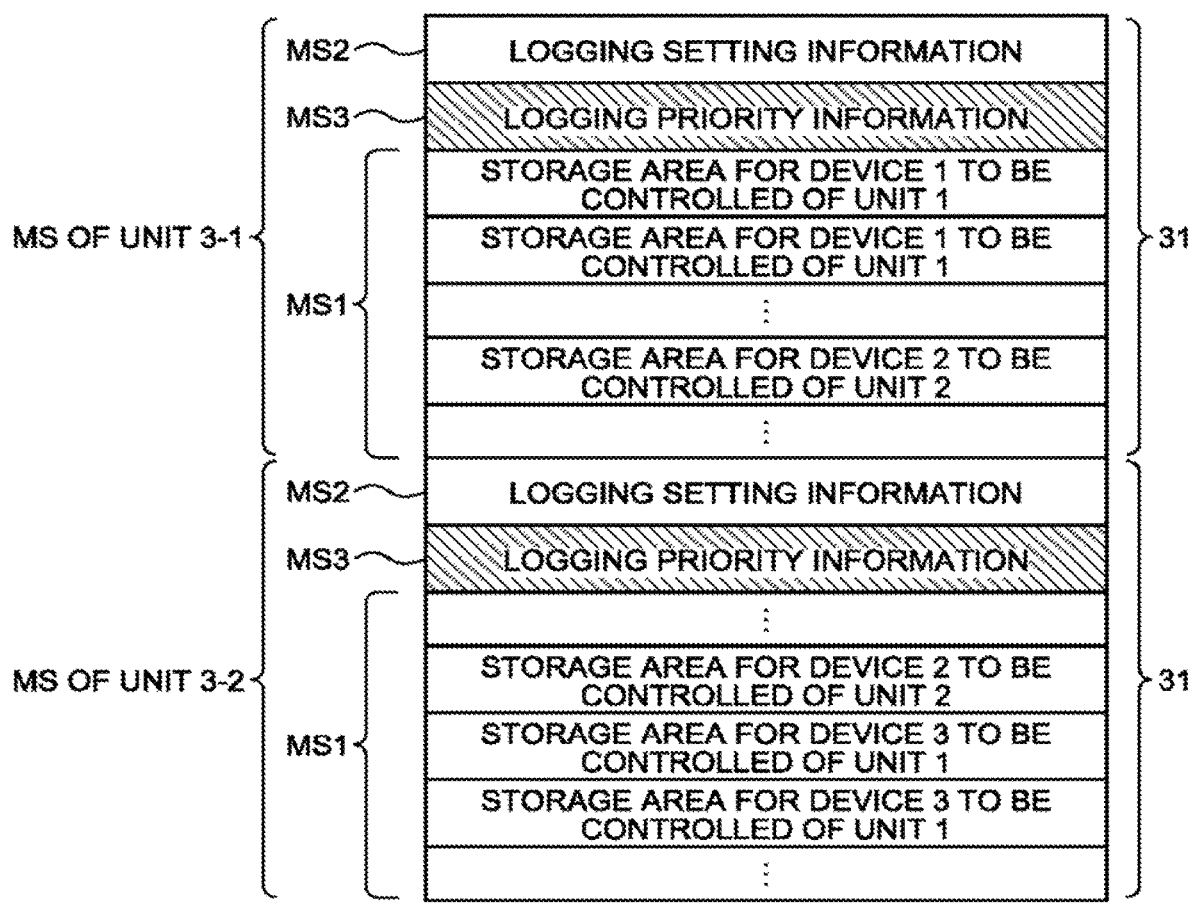
FIG. 14 is a diagram illustrating a storage area of the memory in the entire control system according to the first embodiment.

In the first embodiment, at Step S700 described above, the control unit 32 in each unit 3 subtracts the capacity of the storage area MS2 for storing the logging setting information SI and the capacity of the storage area MS3 for storing the logging priority information PI within the shared memory 31 in each unit 3 at Steps S610 and S613 from the capacity of the available area of the shared memory 31 obtained at Step S100 and sums the capacity for all the units 3. Further, the control unit 32 in each unit 3 equally divides the summed capacity by the number of the devices 2 to be controlled as illustrated in FIG. 14. FIG. 14 is a diagram illustrating a storage area of the shared memory in the entire control system according to the first embodiment.

In the first embodiment, as illustrated in FIG. 14, the control data CD related to the device 2-1 to be controlled in the unit 3-1 is stored in the storage area MS1 of the shared memory 31 in the unit 3-1. The control data CD related to the device 2-3 to be controlled in the unit 3-1 is stored in the storage area MS1 of the shared memory 31 in the unit 3-2. The control data CD related to the device 2-2 to be controlled in the unit 3-2 is stored in both the storage area MS1 of the shared memory 31 in the unit 3-1 and the storage area MS1 of the shared memory 31 in the unit 3-2. In this manner, the control unit 32 in the unit 3-2, which is at least, one of the units 3-1 and 3-2 that constitute the control system 1, allocates the control data CD, related to the device 2-2 controlled to foe connected to its own unit 3a (3-2), to the shared memory 31 that is a first storage unit of its own unit 3a (3-2), and to the shared memory 31 that is a second storage unit of the other unit 3-1, so as to foe stored in the respective shared memories 31. The description "allocates the control data CD . . . so as to foe stored in . . . " in the present invention refers to dividing the control data CD into a plurality of pieces, and storing the divided pieces in the respective shared memories 31. That is, the description "allocates the control data CD . . . so as to foe stored in . . . " in the present invention means that a plurality of shared memories 31 store therein allocated pieces of the control data CD without overlapping with each other.

It is also permissible in the control system 1 that the control unit 32 sets weighting in the priority setting unit 34 in such a manner as to allocate a larger area to the storage area for storing the control data CD related to the device 2 to be controlled with a higher priority than the storage area for storing the control data CD related to the device 2 to be controlled with a lower priority. In this manner, the control system 1 stores the control data CD related to each device 2 to be controlled in the shared memory 31 in accordance with the logging priority information PI set in the priority setting unit 34 and indicating priorities.

The shared memory 31 in the control system 1 according to the first embodiment is provided for each unit 3 in the control system 1. The unit 3 that is a remote unit of the control system 1 has a limitation on the capacity of the storage area MS in the shared memory 31. Because of the limited capacity of the storage area MS in the shared memory 31, the control system 1 uses the shared memory 31 in a ring buffer configuration when the control system 1 is in a state of being capable of transmitting and receiving the control data CD between the controller unit 5 and each of the units 3-1 and 3-2. At any timing before the available area of the shared memory 31 becomes full, the control system 1 transfers the control data CD stored in the shared memory 31 in each unit 3 to the controller unit 5. In the control system 1, the storage area MS1, from which the stored control data CD has been completely transferred to the controller unit h, is overwritten with new control data CD. Thus, the new control data CD is stored in the storage area MS1.

Figure 15:
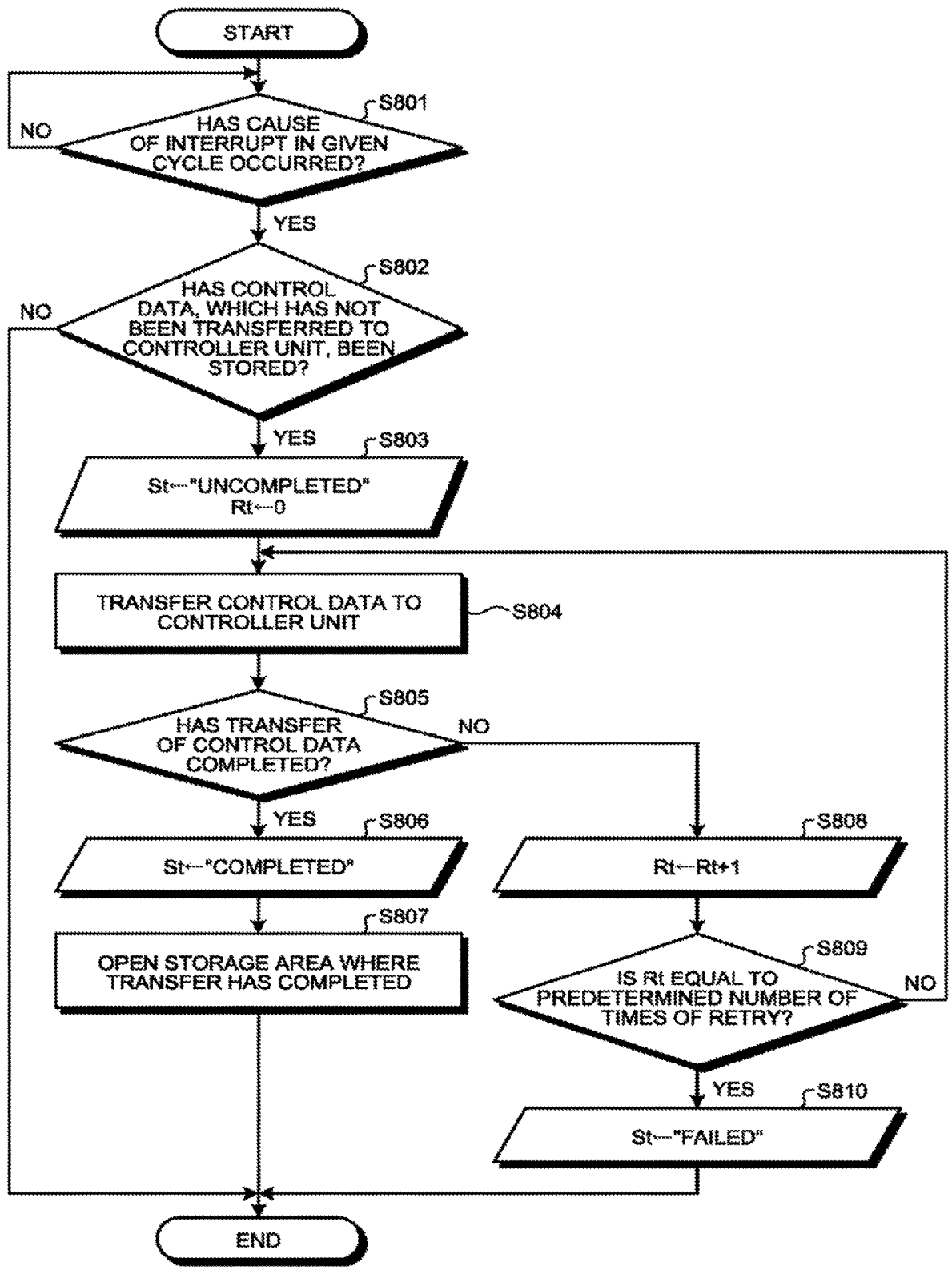
FIG. 15 is a flowchart for explaining an operation to transfer control data which has been stored in the shared memory within the unit to the controller unit in the control system according to the first embodiment.

FIG. 15 is a flowchart for explaining the operation to transfer the control data which has been stored in the shared memory within the unit to the controller unit in the control system according to the first embodiment. In the first embodiment, the flowchart illustrated in FIG. 15, that is, transfer of the control data CD from the shared memory 31 to the controller unit 5 is executed in a given cycle that is at any predetermined timing. However, it is also permissible that the transfer is not performed in a given cycle. In the first embodiment, the control unit 32 in each unit 3 determines whether a cause of interrupt in a given cycle has occurred (Step S801). When the total value of the timer circuit corresponds with the given cycle, the control unit 32 in each unit 3 determines that a cause of interrupt in a given cycle has occurred (YES at Step S801), and then resets the timer circuit to zero. When the total value of the timer circuit does not correspond with the given cycle, the control unit 32 in each unit 3 determines that, a cause of interrupt in a given cycle has not yet occurred (NO at Step S801), and is on standby while repeating Step S801 until the total value of the timer circuit corresponds with the given cycle.

When the control unit 32 in each unit 3 determines that a cause of interrupt in a given cycle has occurred (YES at Step S801), the control unit 32 determines whether the control data CD, which has not yet been transferred to the controller unit 5, has been stored in the storage area MS1 for storing the control data CD within the shared memory 31 in its own unit 3*a* (Step S802). When the control unit 32 in each unit 3 determines that the control data CD, which has not yet been transferred to the controller unit 5, has not been stored in the storage area MS1 (NO at Step S802), the flowchart illustrated in FIG. 15 is ended. When the control unit 32 in each unit determines that the control data CD, which has not yet been transferred to the controller unit 5, has been stored in the storage area MS1 (YES at Step S802), the control unit 32 sets a control-data transfer flag St to "uncompleted", and then stores "0" as the number of times Rt of data-transfer retry (Step S803).

The control unit 32 in each unit 3 transfers the control data CD, which has been stored in the storage area MS1 for storing the control data CD within the shared memory 31 in its own unit 3*a* but has not yet been transferred to the controller unit 5, to the controller unit 5 (Step S804). The control unit 32 in each unit 3 determines whether transfer of the control data CD, which has not yet been transferred to the controller unit 5 at Step S804, is completed (Step S805). When the control unit 32 in each unit 3 determines that transfer of the control data CD is completed (YES at Step S805), the control unit 32 sets the control-data transfer flag St to "completed" (Step S806). The control unit 32 in each unit 3 opens the storage area MS1 for storing the control data CD, which has ail been transferred to the controller unit 5, within the shared memory 31 in its own unit 3*a* as an available area (Step S807). The flowchart illustrated in FIG. 15 is then ended.

When the control unit 32 in each unit 3 determines that transfer of the control data CD is not completed (NO at Step S805), the control unit 32 increments the number of times Rt of data-transfer retry by "1" (Step S808). The control unit 32 in each unit 3 determines whether the number of times Rt of data-transfer retry is a predetermined number of times of retry (Step S809). In the first embodiment, the predetermined number of times of retry is three, however, it is not limited to three. When the control unit 32 in each unit 3 determines that the number of times Rt of data-transfer retry is not a predetermined number of times of retry (NO at Step S809), that is, when the number of times Rt of data-transfer retry is smaller than the predetermined number of times of retry, the process flow returns to Step S804 to transfer the control data CD again (Step S804) and determine whether transfer of the control data CD is completed (Step S805).

When the control unit 32 in each unit 3 determines that the number of times Rt of data-transfer retry is a predetermined number of times of retry (YES at Step S809), that is, when the number of times Rt of data-transfer retry reaches the predetermined number of times of retry, the control unit 32 sets the control-data transfer flag St to "failed" (Step S810). The flowchart illustrated in FIG. 15 is then ended.

Figure 16:
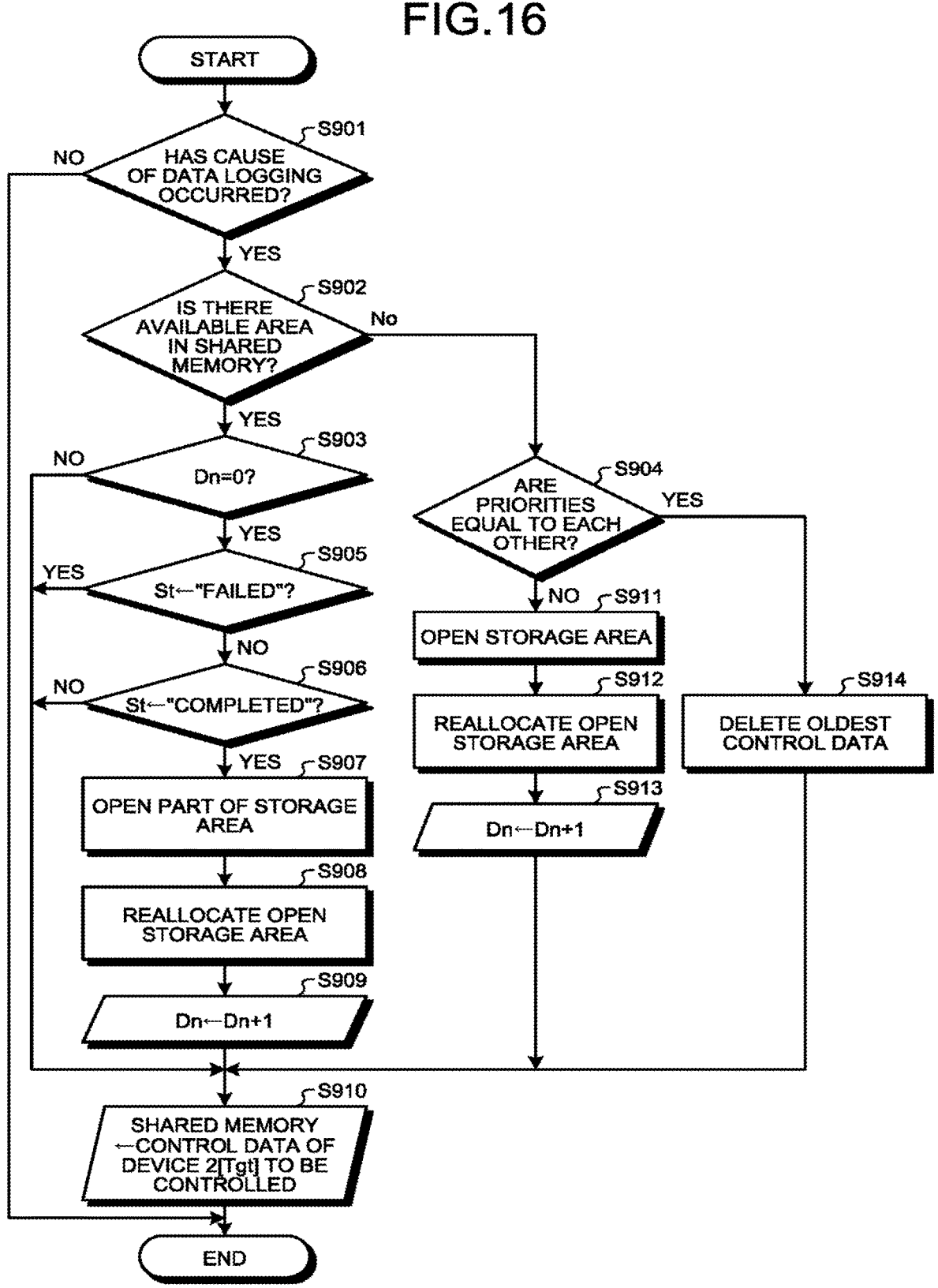
FIG. 16 is a flowchart, for reallocating a storage area of the shared memory in the control system according to the first embodiment.

Next, there is described a process of reallocating the storage area MS of the shared memory 31 in a case where the control system 1 according to the first embodiment, cannot, transfer control data CD from at least one of the units 3 to the controller unit 5. The case where the control system 1 cannot transfer control data CD from at least one of the units 3 to the controller unit 5 refers to a case where the control-data transfer flag St is set to "failed" multiple times consecutively at Step S810 in the flowchart, illustrated in FIG. 15. FIG. 16 is a flowchart for reallocating a storage area of the shared memory in the control system according to the first embodiment.

The control unit 32 in each unit 3 determines whether a cause of data logging has occurred (Step S901). In the first embodiment, the description "a cause of data logging has occurred" means that the control unit 32 in each unit 3 has already received the control data CD, which satisfies the logging start condition having been set in the logging setting unit 33, from the device 2 to be controlled connected to its own unit 3*a*. When the control unit 32 in each unit 3 determines that a cause of data logging has not yet occurred (NO at Step S901), the flowchart illustrated in FIG. 16 is ended.

When the control unit 32 in each unit 3 determines that a cause of data logging has occurred (YES at Step S901), the control unit 32 determines whether there is an available area in the storage area MS1 of the shared memory 31 allocated to the device 2 to be controlled, which has transmitted the control data CD that satisfies the logging start condition, that is, a device 2[Tgt] to be controlled which has generated a cause of data logging (Step S902). The reference sign Tgt indicates a priority given to the device 2 to be controlled which has generated a cause of data logging. The available area at Step S902 indicates a remaining area obtained by subtracting the storage area MS1, in which the control data CD that has not been transferred to the controller unit 5 is stored, from the storage area MS1 of the shared memory 31 allocated to the device 2[Tgt] to be controlled which has generated a cause of data logging. When the control unit 32 in each unit 3 determines that there is an available area (YES at Step S902), the process flow shifts to Step S903. When the control unit 32 determines that, there is not an available area (NO at Step S902), the process flow shifts to Step S904.

At Step S903, the control unit 32 in each unit 3 determines whether the number Dn of the devices 2 to be controlled that have opened the storage area MS1 for storing the control data CD as an available area is "0". The number Dn of the devices 2 to be controlled that have opened the storage area MS1 for storing the control data CD as an available area is initialized to "0" at the start-up of the control system 1, or at the time of initially allocating the storage area MS1 of the shared memory 31. When the control unit 32 in each unit 3 determines that the number Dn of the devices 2 to be controlled that have opened the storage area MS1 for storing the control data CD as an available area is not "0" (NO at Step S903), the process flow shifts to Step S910. The determination that the number Dn of the devices 2 to be controlled that have opened the storage area MS1 for storing the control data CD as an available area is not "0" indicates that at least one of the storage areas MS1 for storing the control data CD related to the device 2 to be controlled with a lower priority is opened as an available area, and is reallocated to store the control data CD related to the device 2 to be controlled with a higher priority.

When the control unit 32 in each unit 3 determines that the number Dn of the devices 2 to be controlled that have opened the storage area MS1 for storing the control data CD as an available area is "0" (YES at Step S903), the control unit 32 determines whether the control-data transfer flag St in the flowchart illustrated in FIG. 15 has been set to "failed" (Step S905). When the control unit 32 in each unit 3 determines that the control-data transfer flag St has been set to "failed" (YES at Step S905), the process flow shifts to Step S910.

When the control unit 32 in each unit 3 determines that the control-data transfer flag St has not been set to "failed" (NO at Step S905), the control unit 32 determines whether the control-data transfer flag St has been set to "completed" (Step S906). When the control unit 32 in each unit 3 determines that the control-data transfer flag St has not been set to "completed" (NO at Step S906), the process flow shifts to Step S910. The control-data transfer flag St having been set to "failed", and the control-data transfer flag St not having been set to "completed" indicate a state in which transfer of the control data CD to the controller unit 5 is not completed for some reason, and the controlled data CD is retained in the shared memory 31.

Until the control unit 32 in each unit 3 completes transfer of the control data CD to the controller unit 5, there is no change in the logging priority information 51, and there is an available area in the storage area MS1 of the shared memory 31 at Step S910. Thus, at Step S910, the control unit 32 in each unit 3 stores the control data CD, received from the device 2[Tgt] to be controlled which has generated a cause of data logging, in the storage area MS1 of the shared memory 31.

When the control unit 32 in each unit 3 determines that the control-data transfer flag St has been set to "completed" (YES at Step S906), transfer of the control data CD to the controller unit 5 is completed. Accordingly, when the control unit 32 in each unit 3 determines that the control-data transfer flag St has been set to "completed" (YES at Step S906), the control unit 32 opens a part of the storage area MS1 for storing the control data CD related to the device 2[Tgt] to be controlled which has generated a cause of data logging as an available area in order to store the control data CD related to the device 2 to be controlled with a lower priority than the device 2[Tgt] to be controlled which has generated a cause of data logging (Step S907). The control unit 32 in each unit 3 reallocates the storage area MS1, which has been opened as an available area at Step S907, as the storage area MS1 for storing the control data CD related to the device 2 to be controlled with a lower priority than the device 2 to be controlled which has generated a cause of data logging (Step S908). Upon completion of reallocation of the storage area MS1, the control unit 32 in each unit 3 adds "1" to the number Dn of the devices 2 to be controlled that have opened the storage area MS1 (Step S909). The process flow shifts to Step S910.

When the control unit 32 in each unit 3 determines that there is no available area remaining in the storage area MS within the shared memory 31 allocated to the device 2[Tgt] to be controlled which has generated a cause of data logging (NO at Step S902), the process flew shifts to Step S904. The control unit 32 in each unit 3 determines whether a priority given to the device 2[Tgt] to be controlled which has generated a cause of data logging is equal to a priority given to a device 2[Num-Dn] to be controlled which is the lowest priority among the devices 2 to be controlled in the entire control system 1, to which the storage area MS1 for storing the control data CD is currently allocated within the shared memory 31 (Step S904). When the control, unit 32 in each unit 3 determines that a priority given to the device 2[Tgt] to be controlled is not equal to a priority given to the device 2[Num-Dn] to be controlled (NO at Step S904), there is the device 2 to be controlled with a lower priority than a priority given to the device 2[Tgt] to be controlled which has generated a cause of data logging. Thus, the process flow shifts to Step S911.

The control unit 32 in each unit 3 opens the storage area MS1 for storing the control data CD related to the device 2[Num-Dn] to be controlled with the lowest priority as an available area (Step S911). The control unit 32 in each unit 3 reallocates the storage area MS1 opened at Step S911 as the storage area MS1 for storing the control data CD related to the device 2[Tgt] to be controlled which has generated a cause of data logging (Step S912). Upon completion of reallocation of the storage area MS1, the control unit 32 in each unit 3 increments the number Dn of the devices 2 to be controlled that have opened the storage area MS1 by "1" (Step S913). The process flow shifts to Step S910.

When the control unit 32 in each unit 3 determines that a priority given to the device 2[Tgt] to be controlled is equal to a priority given to the device 2[Num-Dn] to be controlled (YES at Step S904), it is in a state in which there is only one device 2 to be controlled whose control data CD is logged. Therefore, it is not necessary to open the storage area of the shared memory 31 in accordance with priority settings. Thus, the control unit 32 in each unit 3 deletes the oldest control data CD among the control data CD stored in the storage area MS1 allocated to the device 2[Tgt] to be controlled which has generated a cause of data logging (Step S914) because it is not necessary to open the storage area of the shared memory 31, and the process flow shifts to Step S910. At Step S910, the control unit 32 in each unit 3 stores the control data CD, which is related to the device 2[Tgt] to be controlled which has generated a cause of data logging, in the storage area MS1 from which the oldest control data CD has been deleted.

In the units 3 and the control system 1 according to the first embodiment, the control data CD related to the devices 2 to be controlled connected to at least one of the units 3 that constitute the control system 1 is allocated to and stored in the shared memory 31 of its own unit 3a (3-2) and the shared memory 31 of the other unit 3-1. Thus, the units 3 and the control system 1 can store the control data CD in the storage areas MS1 of the shared memories 31 in all the units 3 that constitute the control system 1. As a result, the units 3 and the control system 1 can effectively use the storage areas MS1 of the shared memories 31 in all the units 3 that constitute the control system 1.

In the units 3 and the control system 1 according to the first embodiment, the control unit 32 in the unit 3 transmits a control signal that serves as the centred data CD to the devices 2 to be controlled on the basis of a signal received from the controller unit 5. As a result, the units 3 and the control system 1 can control each device 2 to be controlled in accordance with a control program.

The control system 1 according to the first embodiment stores the control data CD related to each device 2 to be controlled in the storage area MS1 of the shared memory 31 in accordance with the logging priority information PI that is set in the priority setting unit 34 in the unit 3, and that indicates a priority for storing the control, data CD related to each device 2 to be controlled in the entire control, system 1. Accordingly, the control system 1 can store the control data CD related to each device 2 to be controlled appropriately in accordance with its priority, and consequently can effectively use the storage area MS1 of the shared memory 31.

In the control system 1 according to the first embodiment, the control unit 32 in each unit 3 executes the flowchart illustrated in FIG. 10 to generate the logging priority information PI-1 and PI-2 that indicates priorities for logging the control data CD given to the devices 2 to be controlled in each individual unit 3. After having generated the logging priority information PI-1 and PI-2 for each individual unit 3, the control system 1 merges the logging priority information PI-1 and the logging priority information PI-2 for each individual unit 3 to set the logging priority information PI for logging the control data CD related to all the devices 2 to be controlled in the entire control system 1. Thus, the control system 1 can set priorities of the control data CD related to ail the devices 2 to be controlled that constitute the control system 1.

In the control system 1 according to the first embodiment, the control unit 32 in each unit 3 executes the flowchart illustrated in FIG. 15 to transfer the control data CD stored in the shared memory 31 to the controller unit 5 at any predetermined timing before the available area of the shared memory 31 becomes full. Accordingly, the control system 1 can reliably log the control data CD related to each device 2 to be controlled. The controller unit 5 overwrites the storage area MS1 of the shared memory 31, in which the control data CD transferred is stored, with new control data CD, and stores the new control data CD in the storage area MS1. Accordingly, the control system 1 can effectively use the storage area MS1 of the shared memory 31.

In the control system 1 according to the first embodiment, the control unit 32 in each unit 3 executes the flowchart illustrated in FIG. 16 to open a part of the storage area MS1 in which transfer of the control data CD has completed as an available area where it is possible to store another control data CD, when the control data CD fails to be transferred from at least one of the units 3 to the controller unit 5 multiple times, and when there is an available area in the shared memory 31. Thus, even when the control data CD fails to be transferred from at least one of the units 3 to the controller unit 5 multiple times, the control system 1 can still log the control data CD.

In the control system 1 according to the first embodiment, the control unit 32 in each unit 3 executes the flowchart illustrated in FIG. 16 to open the storage area MS1 for storing the control data CD related to the device 2 to be controlled with a lower priority as an available area where it is possible to store another control data CD, when the control, data CD fails to be transferred from at least one of the units 3 to the controller unit 5 multiple times, and when there is not an available area in the shared memory 31. Thus, in the control system 1, the control unit. 32 can store the control data CD related to each device 2 to be controlled in the shared memory 31, and log the control data CD with a higher priority in accordance with the logging priority information PI having been set in the priority setting unit 34.

Second Embodiment

Figure 17:
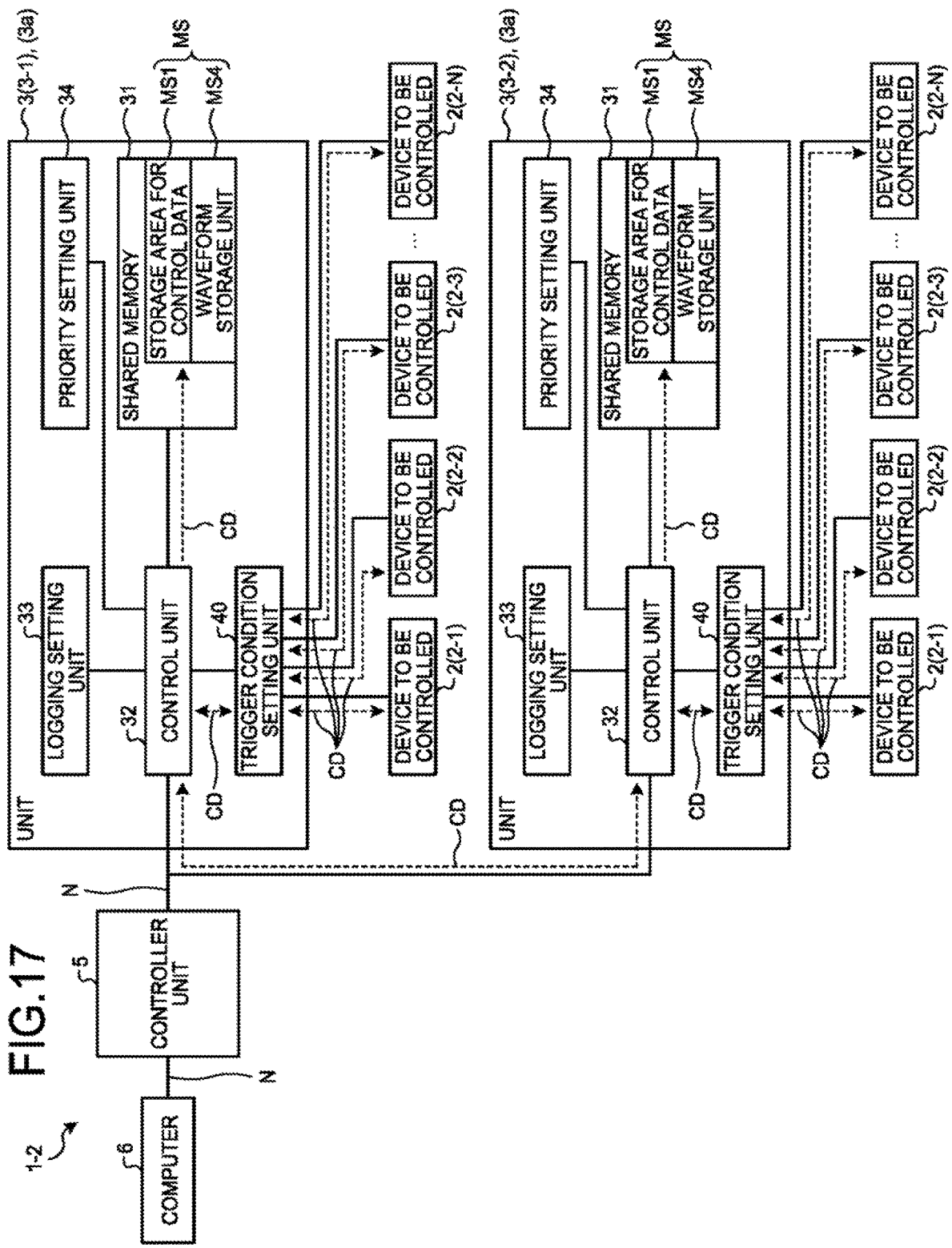
FIG. 17 is a diagram illustrating a configuration of a control system according to a second embodiment.
Figure 18:
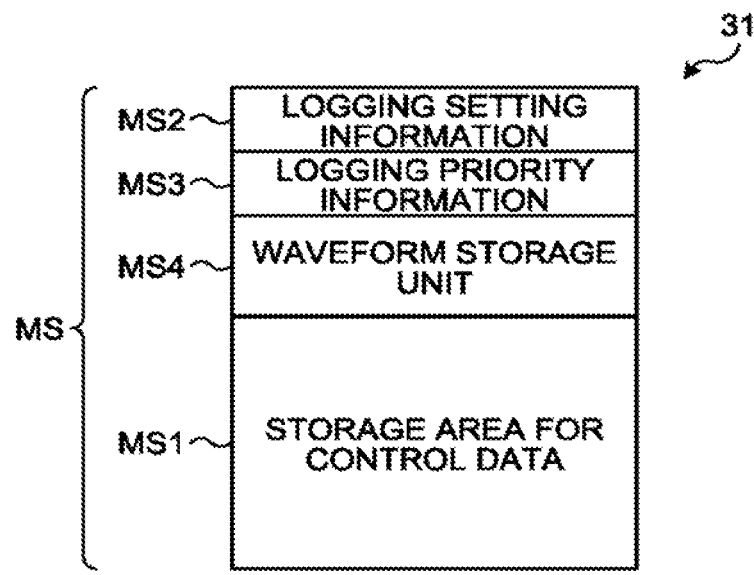
FIG. 18 is a diagram illustrating a storage area of a shared memory in each unit, in the control system according to the second embodiment.

Next, units and a control system 1-2 according to a second embodiment of the present invention are described with reference to the drawings. FIG. 17 is a diagram illustrating a configuration of a control system according to the second embodiment. FIG. 18 is a diagram illustrating a storage area of a shared memory in each unit in the control system according to the second embodiment. In FIGS. 17 and 18, parts identical to those of the first embodiment are denoted by like reference signs and explanations thereof will be omitted.

The control system 1-2 according to the second embodiment is identical in configuration to the first embodiment, except that each unit 3 includes a trigger condition setting unit 40 as illustrated in FIG. 17, and the shared memory 31 includes a waveform storage unit MS4 as illustrated in FIGS. 17 and 18.

Figure 19:
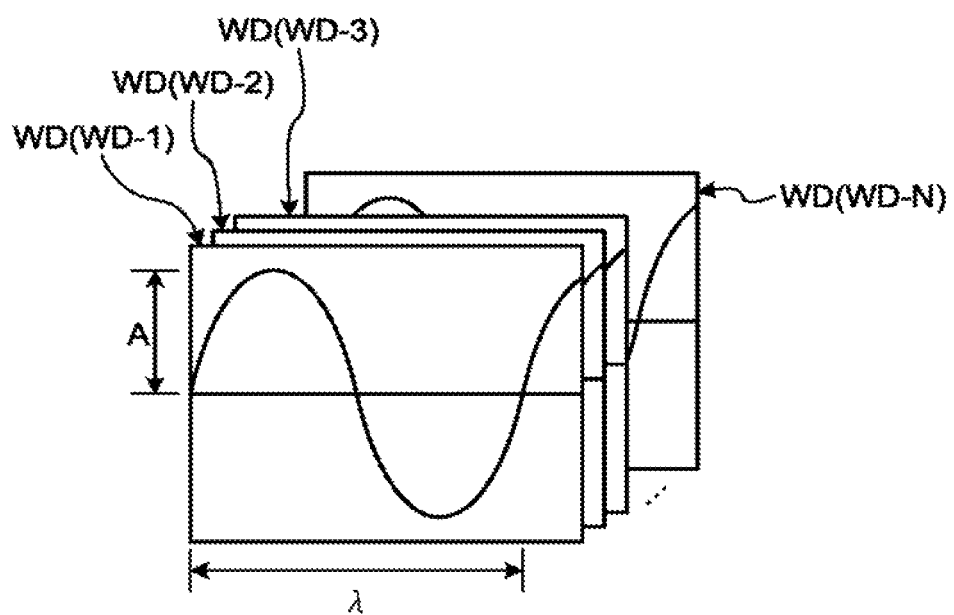
FIG. 19 is a diagram illustrating waveform data stored in a waveform storage unit in the shared memory illustrated in FIG. 18.

The waveform storage unit MS4 constitutes a part of the storage area MS of the shared memory 31. The waveform storage unit MS4 shows a regular operation of the devices 2 to be controlled connected to its own unit 3a, and stores therein waveform data WD illustrated in FIG. 19. FIG. 19 is a diagram illustrating waveform data stored in the waveform storage unit in the shared memory illustrated in FIG. 19.

In the second embodiment, the waveform storage unit MS4 stores therein waveform data WD-1, WD-2, WD-3, . . . , and WD-N, where the number of pieces of the waveform data is equal to the number of the devices 2 to be controlled. The waveform data WD-1, WD-2, WD-3, . . . , and WD-N is brought into a one-to-one correspondence with the devices 2 to be controlled. It is also permissible in the waveform storage unit MS4 that the waveform data WD-1, WD-2, WD-3, . . . , and WD-N individually corresponds to a plurality of the devices 2 to be controlled. In the second embodiment, all the waveform data WD-1, WD-2, WD-3, . . . , and WD-N is a sine wave. All the waveform data WD-1, WD-2, WD-3, . . . , and WD-N is equal in amplitude A and wavelength $\lambda$. The function of the waveform storage unit MS4 is implemented by the shared memory 31.

The trigger condition setting unit 40 determines whether the control data CD related to the device 2 to be controlled connected to its own unit 3a satisfies a predetermined trigger condition for the corresponding waveform data WD stored in the waveform storage unit MS4. That is, the trigger condition setting unit 40 sets the trigger condition to start logging. The trigger condition set by the trigger condition setting unit 40 includes waveform transition of the control data CD input from each device 2 to be controlled, and at least one of the conditions that a difference between the amplitude A of the waveform data WD and the amplitude of the control data CD is equal to or smaller than a predetermined value VA, and a difference between the wavelength $\lambda$ of the waveform data WD and the wavelength of the control data CD is equal to or smaller than a predetermined value Vλ. The control data CD and the waveform data WD are substantially identical to each other with the predetermined values VA and Vλ. The trigger condition setting unit 40 sets the logging start condition, thereby making it possible to prevent excessive usage of the storage area MS1 within the shared memory 31 caused by unnecessarily storing of the control data CD. The function of the trigger condition setting unit 40 is implemented by the MPU 37 by executing a computer program.

In the control system 1-2 according to the second embodiment, the control unit 32 in each unit 3 stores the control data CD which satisfies the trigger condition set by the trigger condition setting unit. 40 in the shared memory 31.

Figure 20:
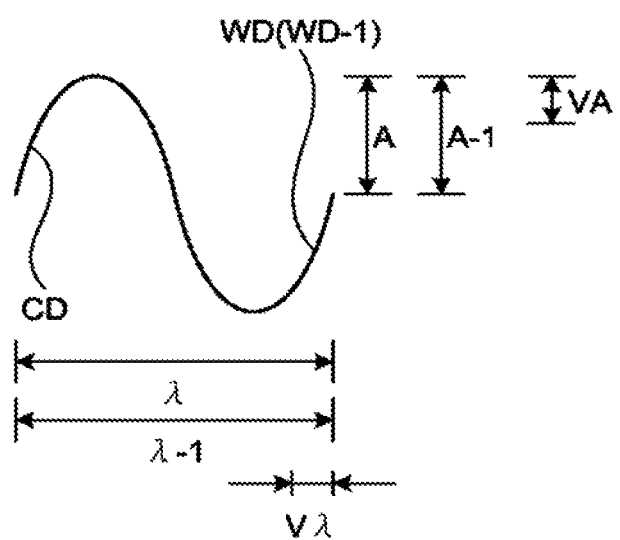
FIG. 20 is a diagram illustrating waveform data of the control system according to the second embodiment, and control data related to a device 1 to be controlled.
Figure 21:
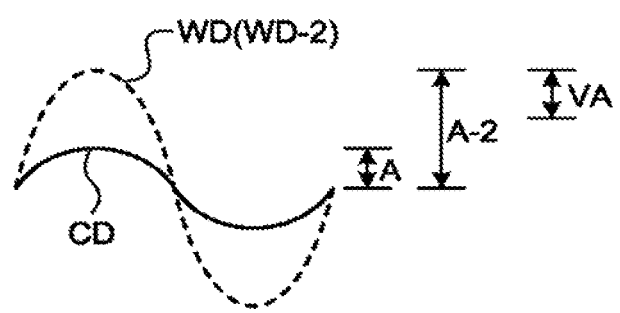
FIG. 21 is a diagram illustrating waveform data of the control system according to the second embodiment, and control data related to a device 2 to be controlled.
Figure 22:
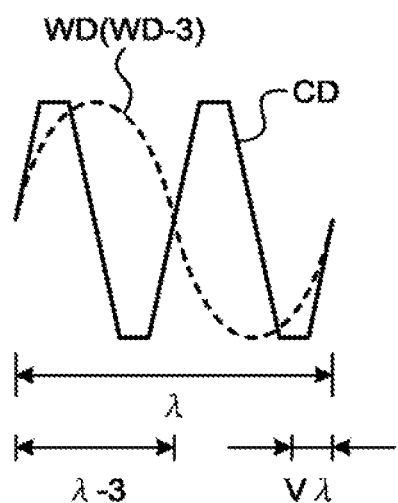
FIG. 22 is a diagram illustrating waveform data of the control system according to the second embodiment, and control data related to a device 3 to be controlled.
Figure 23:
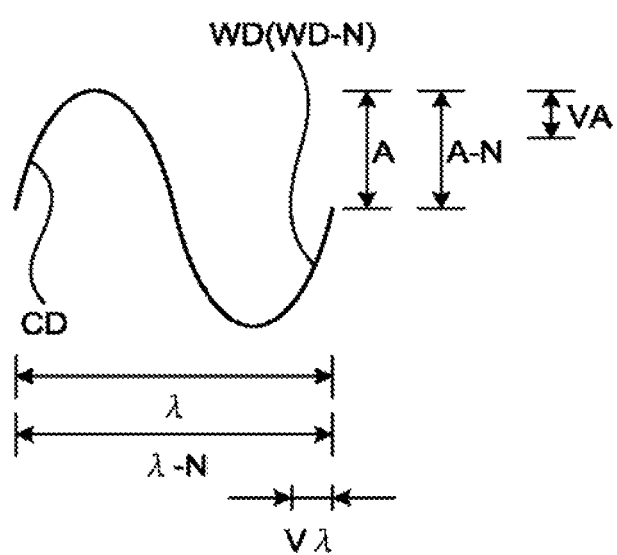
FIG. 23 is a diagram illustrating waveform data of the control system according to the second embodiment, and control data related to a device N to be controlled.

Next, an operation of the trigger condition setting unit 40 in the unit 3 in the control system 1-2 according to the second embodiment is described with reference to the drawings. FIG. 20 is a diagram illustrating waveform data of the control system according to the second embodiment, and control data related to the device 2-1 to be controlled. FIG. 21 is a diagram illustrating waveform data of the control system according to the second embodiment, and control data related to the device 2-2 to be controlled. FIG. 22 is a diagram illustrating waveform data of the control system according to the second embodiment, and control data related to the device 2-3 to be controlled. FIG. 23 is a diagram illustrating waveform data of the control system according to the second embodiment, and control data related to the device 2-N to be controlled.

In the second embodiment, in the logging setting information SI stored in the logging setting unit 33, logging is set to enabled for the devices 2-1, 2-2, and 2-3 to be controlled, while logging is set to disabled for the device 2-N to be controlled. In the second embodiment, as illustrated in FIG. 20, the difference between the amplitude A of the waveform data WD-1 and an amplitude A-1 of the control data CD related to the device 2-1 to be controlled is equal to or smaller than the predetermined value VA. Simultaneously, the difference between the wavelength λ of the waveform data WD-1 and a wavelength λ-1 of the control data CD related to the device 2-1 to be controlled is equal to or smaller than the predetermined value Vλ. In the second embodiment, the trigger condition setting unit 40 determines that the control data CD related to the device 2-1 to be controlled satisfies the trigger condition. Because logging is set to enabled for the device 2-1 to be controlled, the control unit 32 starts storing the control data CD related to the device 2-1 to be controlled.

In the second embodiment, as illustrated in FIG. 21, the difference between the amplitude A of the waveform data WD-2 and an amplitude A-2 of the control data CD related to the device 2-2 to be controlled is equal to or larger than the predetermined value VA. In the second embodiment, the trigger condition setting unit 40 determines that the control data CD related to the device 2-2 to be controlled does not satisfy the trigger condition. Although logging is set to enabled for the device 2-2 to be controlled, the difference between the amplitude A and the amplitude A-2 is equal to or larger than the predetermined value VA, and thus the control unit 32 does not start storing the control data CD related to the device 2-2 to be controlled.

In the second embodiment, as illustrated in FIG. 22, the difference between the wavelength λ of the waveform data WD-3 and a wavelength λ-3 of the control data CD related to the device 2-3 to be controlled is equal to or larger than the predetermined value Vλ. In the second embodiment, the trigger condition setting unit 40 determines that the control data CD related to the device 2-3 to be controlled does not satisfy the trigger condition. Although logging is set to enabled for the device 2-3 to be controlled, the difference between the wavelength λ and the wavelength λ-3 is equal to or larger than the predetermined value Vλ, and thus the control unit 32 does not start storing the control data CD related to the device 2-3 to be controlled.

In the second embodiment, as illustrated in FIG. 23, the difference between the amplitude A of the waveform data WD-N and an amplitude A-N of the control data CD related to the device 2-N to be controlled is equal to or smaller than the predetermined value VA. Simultaneously, the difference between the wavelength λ of the waveform data WD-N and a wavelength λ-N of the control data CD related to the device 2-N to be controlled is equal to or smaller than the predetermined value Vλ. In the second embodiment, the difference between the amplitude A and the amplitude A-N is equal to or smaller than the predetermined value VA, while the difference between the wavelength λ and the wavelength λ-N is equal to or smaller than the predetermined value Vλ. Thus, the trigger condition setting unit 40 determines that the control data CD related to the device 2-N to be controlled satisfies the trigger condition. Because logging is set to disabled for the device 2-N to be controlled, the control unit 32 does not start storing the control data CD related to the device 2-N to be controlled.

In the units 3 and the control system 1-2 according to the second embodiment, the control data CD, related to the devices 2 to be controlled connected to at least one of the units 3 that constitute the control system, is allocated to and stored in the shared memory 31 of its own unit 3a (3-2) and the shared memory 31 of the other unit 3-1 in the same manner as in the first embodiment. As a result, the units 3 and the control system 1-2 according to the second embodiment, can effectively use the storage areas of the shared memories 31 in ail the units 3 that constitute the control system 1-2 in the same manner as in the first embodiment. Further, the units 3 and the control system 1-2 according to the second embodiment store only the control data CD that satisfies the trigger condition, thereby making it possible to reduce excessive usage of the storage area MS1 within the shared memory 31 caused by unnecessarily storing the control, data CD.

Third Embodiment

Figure 24:
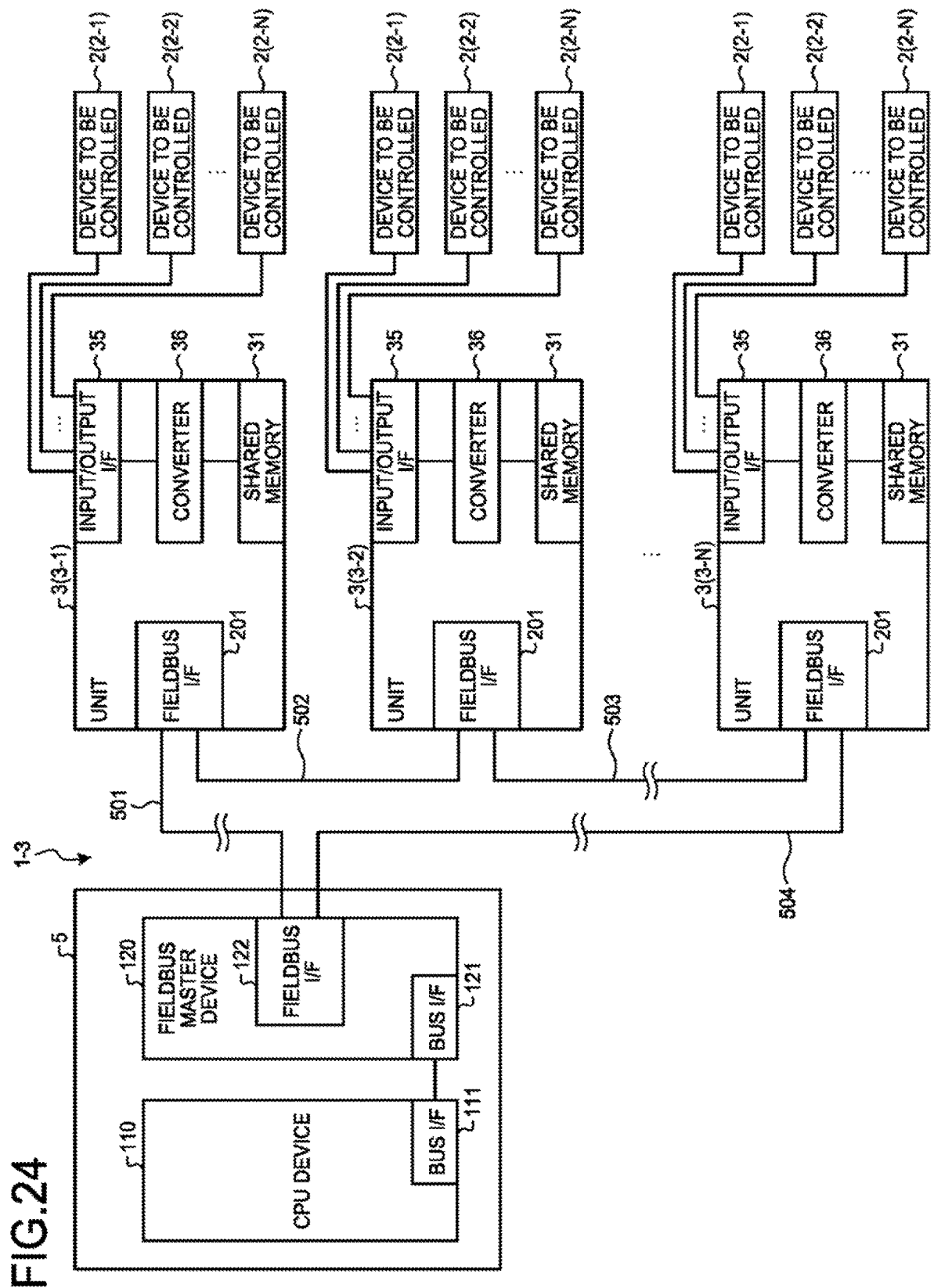
FIG. 24 is a diagram illustrating a configuration of a control system according to a third embodiment.

Next, the units 3 and a control system 1-3 according to a third embodiment, of the present invention are described with reference to the drawings. FIG. 24 is a diagram illustrating a configuration of the control system according to the third embodiment. In FIG. 24, parts identical to those of the first embodiment are denoted by like reference signs and explanations thereof will be omitted.

The control system 1-3 according to the third embodiment is a distributed control system identical to the first embodiment. The units 3 in the control system 1-3 according to the third embodiment are so-called "remote analog units" that store control, data CD that is an analog signal related to the devices 2 to be controlled. The control system 1-3 according to the third embodiment includes N units 3, where N is a natural number. Therefore, in FIG. 24, an N-th unit 3 is denoted by a reference sign 3-N. The controller unit 5 in the control system 1-3 according to the third embodiment is configured by including a CPU device 110 and a fieldbus master device 120. The CPU device 110 and the fieldbus master device 120 are connected by bus interfaces 111 and 121.

The units 3 that, are constituent elements of the control system 1-3 are connected to a fieldbus interface 122 included in the fieldbus master device 120 by fieldbuses 501 and 504. The units 3 that are constituent elements of the control system 1-3 are connected to each other by fieldbuses 502 and 503. In the third embodiment, the fieldbuses 501, 502, 503, and 504 can use the Ethernet® system or serial communication defined by RS-232C, serial communication defined by RS-422, or serial communication defined by RS-438. However, the fieldbus system is not limited thereto. RS-232C, RS-422, and RS-485 standards are the ETA communication standards. In the third embodiment, the control system 1-3 includes only one fieldbus master device 120; however, the fieldbus master device 120 can be provided in plural.

Each unit 3 includes a fieldbus interface 201 through which fieldbus communication is performed between the units 3. The input/output interface 35 in each unit 3 is an analog input I/F that inputs an analog signal from the devices 2 to be controlled. The converter 36 in each unit 3 is an A/D converter that converts an analog signal input to the input/output interface 35 to a digital signal. The shared memory 31 in each unit 3 stores therein a digital signal that is converted by the converter 36 as control data CD. The input/output interface 35 in each unit 3 is connected to the devices 2 to be controlled that output an analog signal.

In the control system 1-3 according to the third embodiment, the units 3 connected to each other by the fieldbuses 501, 502, 503, and 504 are all identical in internal configuration. However, the units 3 are not limited to having an identical internal configuration. It is also permissible that the control system 1-3 includes a remote unit that serves as the unit 3, but does not have a function of converting an analog signal to a digital signal.

The shared memory 31 in the control system 1-3 according to the third embodiment is located in each unit 3. In the control system 1-3 according to the third embodiment, the logging setting unit 33, the priority setting unit 34, and the trigger condition setting unit 40 are located in the unit 3, or are allocated within the storage area MS of the shared memory 31 to implement these units. The control system 1-3 according to the third embodiment operates to allocate the storage area MS of the shared memory 31 on the basis of the logging setting information SI and the logging priority information PI in the same manner as the operation in the first embodiment. The control system 1-3 according to the third embodiment starts logging in the same manner as in the second embodiment.

In the units 3 and the control system 1-3 according to the third embodiment, the control data CD, related to the devices 2 to be controlled connected to at least one of the units 3 that constitute the control system 1-3, is allocated to and stored in the shared memory 31 of its own unit 3a (3-2) and the shared memory 31 of the other unit 3-1 in the same manner as in the first embodiment. As a result, the units 3 and the control system 1-3 according to the third embodiment can effectively use the storage areas MS of the shared memories 31 in all the units 3 that constitute the control system 1-3 in the same manner as in the first embodiment.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1, 1-2, 1-3 control system, 2, 2-1, 2-2, 2-3, 2-N device to be controlled (control-target device), 3, 3-2 unit, 3-1 unit (the other unit), 3a its own unit (own unit), 5 controller unit, 31 shared memory (storage unit, first storage unit, second storage unit), 32 control unit, 34 priority setting unit, CD control data, PI logging priority information (priority), WD, WD-1, WD-2, WD-3, WD-N waveform data, λ wavelength of waveform data, A amplitude of waveform data, λ-1, λ-3, λ-N wavelength of control data, A-1, A-2, A-N amplitude of control data, Vλ, VA predetermined value.

The invention claimed is:

1. A unit connected to both another unit and one or more control-target devices, the unit comprising:
   a controller connected to the control-target devices; and
   a first memory to store therein information, wherein
   the controller divides control data related to the control-target devices into a plurality of pieces, and stores divided pieces of the control data respectively in the first memory and a second memory of the another unit,
   the first memory and the second memory share a storage area, and
   in a state of transmitting and receiving the control data between the unit and the another unit, and a controller unit connected to the unit and the another unit, the first memory and the second memory are used in a ring buffer configuration, and at a timing when a cause of interrupt in a given cycle has occurred before an available area of the first memory and the second memory becomes full, the control data stored in the first memory and the second memory is transferred to the controller unit.

2. The unit according to claim 1, wherein the unit is connected to the another unit via a network.

3. The unit according to claim 1, wherein
   the controller transmits a control signal for controlling the control-target devices as the control data to the control-target devices on a basis of a signal received from the controller unit.

4. The unit according to claim 2, wherein
   the controller transmits a control signal for controlling the control-target devices as the control data to the control-target devices on a basis of a signal received from the controller unit.

5. A control system comprising:
   a plurality of units, each of which is connected to one or more control-target devices and includes a memory, where the units are connected to each other, wherein
   a unit of the plurality of units includes a controller connected to the control-target devices connected to the unit,
   the controller in the unit divides control data, related to the control-target devices connected to the unit, into a plurality of pieces, and stores divided pieces of the control data respectively in the memory of the unit and the memory of another unit in the units,
   the memory of the unit and the memory of the another unit share a storage area, and
   in a state of transmitting and receiving the control data between the units and a controller unit connected to the units, in the control system, the memory of the unit and the memory of the another unit are used in a ring buffer configuration, and at a timing when a cause of interrupt in a given cycle has occurred before an available area of the memory of the unit and the memory of the another unit becomes full, the control data stored in the memory of the unit and the memory of the another unit is transferred to the controller unit.

6. The control system according to claim 5, wherein
the controller transmits a control signal for controlling the control-target devices as the control data to the control-target devices on a basis of a signal received from the controller unit.

7. A control system comprising:
a plurality of units, each of which is connected to one or more control-target devices and includes a memory, where the units are connected to each other, wherein
a unit of the plurality of units includes a controller connected to the control-target devices connected to the unit,
the controller in the unit allocates control data, related to the control-target devices connected to the unit, to the memory of the unit and the memory of another unit in the units so as to be stored respectively in the memory of the unit and the memory of the another unit,
the unit includes circuitry to set a priority for storing the control data related to each control-target device in the entire control system, and
the controller stores the control data related to each control-target device in the memory in accordance with the priority set by the circuitry, and, in response to the memory being insufficient to store all the control data, the controller omits storing control data related to a control-target device that is of lowest priority.

8. A control system comprising:
a plurality of units, each of which is connected to one or more control-target devices and includes a memory, where the units are connected to each other, wherein
a unit of the plurality of units includes a controller connected to the control-target devices connected to the unit,
the controller in the unit allocates control data, related to the control-target devices connected to the unit, to the memory of the unit and the memory of another unit in the units so as to be stored respectively in the memory of the unit and the memory of the another unit,
the memory in the unit includes a waveform memory to store therein waveform data indicating a regular operation of the control-target devices connected to the unit,
the unit includes circuitry to determine whether the control data related to the control-target devices connected to the unit satisfies a predetermined trigger condition for the waveform data stored in the waveform memory, and
the controller stores the control data in the memory, in response to the circuitry determining that the control data satisfies the trigger condition, and omits storing the control data in the memory, in response to the circuitry determining that the control data does not satisfy the trigger condition.

9. The control system according to claim 8, wherein the predetermined trigger condition is that a difference between an amplitude of the waveform data and an amplitude of the control data is equal to or smaller than a predetermined value.

10. The control system according to claim 8, wherein the predetermined trigger condition is that a difference between a wavelength of the waveform data and a wavelength of the control data is equal to or smaller than a predetermined value.

11. The control system according to claim 8, further comprising a controller unit connected to the units, wherein
the controller transmits a control signal for controlling the control-target devices as the control data to the control-target devices on a basis of a signal received from the controller unit.

12. The control system according to claim 8, wherein
the circuitry sets a priority for storing the control data related to each control-target device in the entire control system, and
the controller stores the control data related to each control-target device in the memory in accordance with the priority set by the circuitry.

13. The control system according to claim 11, wherein the predetermined trigger condition is that a difference between an amplitude of the waveform data and an amplitude of the control data is equal to or smaller than a predetermined value.

14. The control system according to claim 12, wherein the predetermined trigger condition is that a difference between an amplitude of the waveform data and an amplitude of the control data is equal to or smaller than a predetermined value.

15. The control system according to claim 11, wherein the predetermined trigger condition is that a difference between a wavelength of the waveform data and a wavelength of the control data is equal to or smaller than a predetermined value.

16. The control system according to claim 12, wherein the predetermined trigger condition is that a difference between a wavelength of the waveform data and a wavelength of the control data is equal to or smaller than a predetermined value.

* * * * *